US006226071B1

(12) United States Patent
Ishii et al.

(10) Patent No.: US 6,226,071 B1
(45) Date of Patent: May 1, 2001

(54) PHOTOGRAPHIC PROCESSING SYSTEM

(75) Inventors: Hideo Ishii; Shigeharu Koboshi; Minoru Ogawa; Shigeru Takeuchi; Masahiro Hamasaki, all of Tokyo (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/448,975

(22) Filed: Nov. 24, 1999

Related U.S. Application Data

(62) Division of application No. 08/809,552, filed on Mar. 13, 1997, now Pat. No. 6,031,596.

(30) Foreign Application Priority Data

Jan. 24, 1996 (JP) ... 8-10148
Jan. 25, 1996 (JP) ... 8-10751
Mar. 25, 1996 (JP) ... 8-68034
May 9, 1996 (JP) ... 8-115134
Dec. 27, 1996 (JP) ... 8-357686

(51) Int. Cl.[7] ... G03B 27/52
(52) U.S. Cl. ... 355/40; 355/77
(58) Field of Search ... 355/40, 41, 77, 355/38; 235/437

(56) References Cited

U.S. PATENT DOCUMENTS 4,760,574 * 7/1988 Budworth et al. ... 355/40
4,974,096 * 11/1990 Wash ... 355/40
5,124,742 * 6/1992 Yoshikawa ... 355/27
5,159,385 * 10/1992 Imamura ... 355/28
5,212,512 * 5/1993 Shiota ... 396/612
5,231,439 * 7/1993 Takahashi et al. ... 396/620
5,231,451 * 7/1993 Uekusa et al. ... 355/29
5,452,050 * 9/1995 Ishikawa et al. ... 355/27

FOREIGN PATENT DOCUMENTS 4-123056 * 4/1992 (JP) .
4-123058 * 4/1992 (JP) .
4-124665 * 4/1992 (JP) .
4-317057 * 4/1992 (JP) .
4-314047 * 11/1992 (JP) .
7-270933 * 10/1995 (JP) .

* cited by examiner

*Primary Examiner*—D. Rutledge
(74) *Attorney, Agent, or Firm*—Jordan B. Bierman; Bierman, Muserlian and Lucas

(57) ABSTRACT

In a photographic processing system for processing a photographic film for each order without splicing it to other photographic film, a destination of each of plural photographic films having a different destination from each other is determined based on photographic film destination determining information recorded on a photographic film to be processed.

10 Claims, 9 Drawing Sheets

FIG. 5

| ASSORTING APPARATUS / RECEPTION NO. | 80 | 91 |
|---|---|---|
| 0062537 | 2 | 10 |
| 0177399 | 4 | 21 |
| 0043528 | 3 | 3 |
| | | |
| 00325117 | 2 | 45 |
| 00294325 | 1 | 38 |

PHOTOGRAPHIC PROCESSING SYSTEM

CROSS REFERENCE TO RELATED APPLICATIONS

This application is a divisional of U.S. patent application Ser. No. 08/809,552 filed Mar. 13, 1997, now U.S. Pat. No. 6,031,596, which was the national phase 35 USC 371 of International Application PCT/JP97/00155.

TECHNICAL FIELD

The present invention relates to a photographic processing system for processing a photographic film for each order without splicing the photographic film to another photographic film. Further, the present invention relates to a method of determining a destination to which the photographic film is conveyed.

Herein, the photographic processing system means an assemblage including at least two apparatus for conducting developing an undeveloped photographic film, exposing an image on a developed photographic film to a photographic paper, cutting the developed photographic film, packaging the developed photographic film in a bag, developing the exposed photographic paper, cutting the developed photographic paper (a print), returning the developed photographic film to a return-destination, in particular, an assemblage in which these apparatus are integrated in one body or are linked by a conveying means.

TECHNICAL BACKGROUND

Generally, in many cases, a customer who is the owner of a photographic film wants either a photographic process of a so-called simultaneous print process in which a developing process for an undeveloped photographed photographic film and a printing process for obtaining a print by printing an image on the developed photographic film to a photographic paper are conducted, a so-called negative film printing process in which only a printing process for obtaining a print by printing an image on a developed photographic film to a photographic paper is conducted, or a so-called only developing process in which only a developing process for an undeveloped photographed photographic film is conducted, and orders such the processes for a photographic film process handling shop (hereinafter merely referred to as a handling shop).

Some handling shops conduct the above processes in their shop. On the other hand, some handling shops which receives a great number of orders from customers transfer the orders of customers to a so-called a large-scale photo-finishing laboratory that is a trader to conduct photographic processes in response to the orders of customers transferred from a plurality of handling shops. Further, as rare cases, a customer directly orders the photographic processes to the large-scale photo-finishing laboratory.

The handling shop passes the Large-Labo with the order of a customer over a bag in which an undeveloped film or a developed film of the customer is packaged. On the bag, the following information is recorded: the name of the customer, a phone number of the customer, a receiving date on which the order is received, a finishing date on which the ordered photographic process is completed, the name of a film maker, an ordered photographic process such as the simultaneous print process or the negative film printing process, an identified information of a film frame to which a printing process is requested in the case of the negative film printing process, print-number information of the film frame, a print size which herein means a width size of a photographic paper to which an image of the developed photographic film is printed, for example, E or L size, a surface quality of photographic paper such as glossy or silk, and so on. All of the above information is not necessarily recorded, and the above information may be selectably recorded as needed. Further, another information may be recorded. In the case that a customer directly orders photographic processes to a large-scale photo-finishing laboratory, the undeveloped photographed photographic film of the customer is packed in such the bag and is passed over to the large-scale photo-finishing laboratory. Generally, in such the bag, a number of pieces of undeveloped photographed photographic film or developed photographic film corresponding to one order of a customer is packed. Herein, the one order means a unit of orders by which a roll of photographic film is handled as the maximum. For example, a roll of 135-type film packaged in a 135-type film cartridge, or one or more pieces of cut-out photographic film separated from a roll of 135-type photographic film is handled by the one order.

When a large-scale photo-finishing laboratory receives an undeveloped photographed photographic film or a developed photographic film packed in a bag mentioned above, the large-scale photo-finishing laboratory conducts photographic processes in accordance with a request of a customer recorded on the bag. With regard to the undeveloped photographed photographic film, plural undeveloped photographed photographic films are spliced with a splice tape so as to form a long roll and then are subjected to photographic processes. The photographic film to which the photographic processes in accordance with the request of the customer are completed is packaged in the above bag for each order and is returned to a handling shop or directly to the customer.

Incidentally, since the plural photographic films which are jointed to each other with a splicing tape is finally returned for each order to a handling shop or directly to a customer in the bag together with printing papers if requested, the joint section of the plural photographic films are separated by peeling off the splicing tape or by cutting out the joint section. The work to separate the joint section is one of major causes to lower the processing efficiency of the photographic processes in the large-scale photo-finishing laboratory. To counter such the problem, it may be considered that an undeveloped photographed photographic film is processed for each order without splicing plural undeveloped photographed photographic film. In a current photographic process in a Large-Labo, it is necessary to shift a photographic film and a back packaged the photographic film in a form capable of identifying each other in order to get information necessary for the photographic process. In the case that plural photographic films are spliced, since a processing order of the plural photographic films are simply determined by the splicing order, if the backs are arranged their order in a form matching with the splicing order of the plural photographic films, a corresponding relationship between the bags and the plural photographic films may be maintained. However, in the case that the plural photographic film are processed for each order without being spliced, since the processing order of the plural photographic film may not be simply determined, it may be difficult to maintain the corresponding relationship between the bags and the plural photographic films. As a result, the information recorded on the bag may not be utilized for the photographic processes. Further, when a negative film printing process is conducted in a large-scale photo-finishing laboratory, a developed photographic film is processed for each order without being engaged with another developed photographic film with a splicing tape. Accordingly, as same as the case that an undeveloped photographic film is processed for each order without being engaged with another undeveloped photographic film with a splicing tape, it may be difficult to maintain the corresponding relationship between the bags and the plural developed photographic films.

As a result, also, the information recorded on the bag may not be utilized for the photographic processes. Further, there may be raised a big problem that a destination of a photographic film in a photographic processing system may not be determined.

An objective of the present invention is to provide a photographic processing system and a method of determining a destination to which a photographic film is conveyed, for solving the above problem in the case that a photographic film is processed for each order without splicing with another photographic film.

DISCLOSURE OF THE INVENTION

The objective of the invention is attained by the photographic processing system or the destination determining method for a photographic film according to the invention as explained below.

Item 1

In a photographic processing system for processing a photographic film for each order without splicing it to other photographic film, the photographic processing system is characterized in that a destination of each of plural photographic films having a different destination from each other is determined based on photographic film destination determining information recorded on a photographic film to be processed.

According to the photographic processing system of Item 1, in a photographic processing system for processing a photographic film for each order without splicing it to other photographic film, since a destination of each of plural photographic films having a different destination from each other is determined based on photographic film destination determining information recorded on a photographic film to be processed, an event in which the destination of the photographic film can not be determined due to the separation of the photographic film destination determining information from the photographic film can be avoided, and an automation of the photographic processing system can be enhanced.

Item 2

The photographic processing system described in Item 1. is characterized in that the photographic film destination determining information is the return-destination specifying information.

According to the photographic processing system of Item 2, an event in which the destination of the photographic film can not be determined due to the separation of the return-destination specifying information of the photographic film from the photographic film can be avoided, and an automation of the photographic processing system can be enhanced.

Item 3

The photographic processing system described in Item 2 is characterized in that the return-destination specifying information is information specifying a receiving place of the photographic film and/or the owner of the photographic film.

According to the photographic processing system of Item 3, an event in which the destination of the photographic film can not be determined due to the separation of the information specifying a receiving place of the photographic film and/or the owner of the photographic film from the photographic film can be avoided, and an automation of the photographic processing system can be enhanced.

Item 4

The photographic processing system described in Item 2 or 3 is characterized in that there is provided with a discriminating means for discriminating based on the return-destination specifying information a return-destination to which the photographic film recorded with the return-destination specifying information is returned.

According to the photographic processing system of Item 4, since the photographic processing system is provided with the discriminating means, the return-destination to which the photographic film recorded the return-destination specifying information can be surely discriminated.

Item 5

The photographic processing system described in either one of Items 2 to 4 is characterized in that the photographic processing system comprises an exposing apparatus for exposing an image of the photographic film to a photographic paper and a sorting apparatus for sorting the photographic film for each return-destination.

According to the photographic processing system of Item 5, in the photographic processing system comprising an exposing apparatus for exposing an image of the photographic film to a photographic paper and a sorting apparatus for sorting the photographic film for each return-destination, an event in which the destination of the photographic film can not be determined can be avoided, and an automation of the photographic processing system can be enhanced.

Item 6

The photographic processing system described in either one of Items 2 to 4 is characterized in that the photographic processing system comprises a developing apparatus for developing the photographic film and a sorting apparatus for sorting the photographic film for each return-destination.

According to the photographic processing system of Item 6, in the photographic processing system comprising a developing apparatus for developing the photographic film and a sorting apparatus for sorting the photographic film for each return-destination, an event in which the destination of the photographic film can not be determined can be avoided, and an automation of the photographic processing system can be enhanced.

Item 7

The photographic processing system described in either one of Items 2 to 4 is characterized in that the photographic processing system comprises a developing apparatus for developing the photographic film, an exposing apparatus for exposing an image of the photographic film to a photographic paper and a sorting apparatus for sorting the photographic film for each return-destination.

According to the photographic processing system of Item 7, in the photographic processing system comprising a developing apparatus for developing the photographic film, an exposing apparatus for exposing an image of the photographic film to a photographic paper and a sorting apparatus for sorting the photographic film for each return-destination, an event in which the destination of the photographic film can not be determined can be avoided, and an automation of the photographic processing system can be enhanced.

Item 8

The photographic processing system described in either one of Items 5 to 7 is characterized in that the sorting apparatus comprises a discriminating means for discriminating the return-destination.

According to the photographic processing system of Item 8, since the sorting apparatus for sorting for each return-destination is provided with the discriminating means, the return-destination can be surely discriminated.

Item 9

The photographic processing system described in Item 5 or 8 is characterized in that the sorting apparatus sorts a photographic film exposed by the exposing apparatus before returning it to the return-destination.

According to the photographic processing system of Item 9, in the photographic processing system in which the sorting apparatus sorts a photographic film exposed by the exposing apparatus before returning it to the return-destination, an event in which the destination of the photographic film can not be determined can be avoided, and an automation of the photographic processing system can be enhanced.

Item 10

The photographic processing system described in Item 9 is characterized in that the photographic film is a developed short-length photographic film.

According to the photographic processing system of Item 10, in the photographic processing system in which the photographic film is a developed short photographic film, an event in which the destination of the photographic film can not be determined can be avoided, and an automation of the photographic processing system can be enhanced.

Item 11

Photographic processing system described in Item 6 or 8 is characterized in that the sorting apparatus sorts a photographic film developed by the developing apparatus before returning it to the return-destination.

According to the photographic processing system of Item 11, in the photographic processing system in which the sorting apparatus sorts a photographic film developed by the developing apparatus before returning it to the return-destination, an event in which the destination of the photographic film can not be determined can be avoided, and an automation of the photographic processing system can be enhanced.

Item 12

The photographic processing system described in Item 7 or 8 is characterized in that an image of a photographic film developed by the developing apparatus is exposed onto a photographic paper by the exposing apparatus before returning it to the return-destination and the sorting apparatus sorts the exposed photographic film before returning it to the return-destination.

According to the photographic processing system of Item 12, in the photographic processing system in which an image of a photographic film developed by the developing apparatus is exposed on a photographic paper by the exposing apparatus before returning it to the return-destination and the sorting apparatus sorts the exposed photographic film before returning it to the return-destination, an event in which the destination of the photographic film can not be determined can be avoided, and an automation of the photographic processing system can be enhanced.

Item 13

The photographic processing system described in Item 9 is characterized in that the photographic film is a long-length photographic film.

According to the photographic processing system of Item 13, in the photographic processing system in which the photographic film is a long-length photographic film, an event in which the destination of the photographic film can not be determined can be avoided, and an automation of the photographic processing system can be enhanced.

Item 14

The photographic processing system described in Item 1. is characterized in that the photographic film destination determining information is print-specification information.

According to the photographic processing system of Item 14, an event in which the destination of the photographic film at which the photographic film is printed to a photographic paper under the requested print-specification in the photographic processing system can not be determined due to the separation of the print-specification information of the photographic film from the photographic film can be avoided, and an automation of the photographic processing system can be enhanced.

Item 15

The photographic processing system described in Item 14 is characterized in that there is provided with a discriminating means for discriminating based on the print-specification information a print-specification under which a photographic film recorded with the print-specification information is exposed.

According to the photographic processing system of Item 15, since the photographic processing system is provided with the discriminating means, the print-specification under which a photographic film recorded with the print-specification information is exposed can be surely discriminated.

Item 16

The photographic processing system described in Item 15 is characterized in that the photographic film is a long-length photographic film.

According to the photographic processing system of Item 16, in the photographic processing system in which the photographic film is a long-length photographic film, an event in which the destination of the photographic film at which the photographic film is printed to a photographic paper under the requested print-specification in the photographic processing system can not be determined can be avoided, and an automation of the photographic processing system can be enhanced.

Item 17

The photographic processing system described in either one of Items 14 to 16 is characterized in that the photographic processing system comprises a developing apparatus for developing the photographic film, a sorting apparatus for sorting the photographic film for each print-specification and an exposing apparatus for exposing an image of the photographic film onto a photographic paper under the print-specification.

According to the photographic processing system of Item 17, in the photographic processing system comprising a developing apparatus for developing the photographic film, a sorting apparatus for sorting the photographic film for each print-specification and an exposing apparatus for exposing an image of the photographic film to a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 18

The photographic processing system described in Item 17 is characterized in that the sorting apparatus for sorting for each print-specification comprises a discriminating means for discriminating the print-specification.

According to the photographic processing system of Item 18, since the sorting apparatus for sorting for each print-specification is provided with the discriminating means for discriminating the print-specification, the print-specification of the photographic film can be surely discriminated and the photographic film can be sorted.

Item 19

The photographic processing system described in Item 17 or 18 is characterized in that a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification.

According to the photographic processing system of Item 19, in the photographic processing system in which a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 20

The photographic processing system-described in either one of Items 17 to 19 is characterized in that the developing apparatus is provided for each print-specification.

According to the photographic processing system of Item 20, in the photographic processing system in which the developing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 21

The photographic processing system described in either one of Items 17 to 20 is characterized in that the exposing apparatus is provided for each print-specification.

According to the photographic processing system of Item 20, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 22

The photographic processing system-described in Item 17 or 18 is characterized in that a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification.

According to the photographic processing system of Item 22, in the photographic processing system in which a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 23

The photographic processing system described in either one of Items 17, 18, and 22 is characterized in that the exposing apparatus is provided for each print-specification.

According to the photographic processing system of Item 23, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 24

The photographic processing system described in Items 14 to 23 is characterized by comprising an inputting means for inputting a photographic film identification information and the print-specification information of a photographic film which is identified by the photographic film identification information, based on a sheet on which the photographic film identification information and the print-specification information of the photographic film which is identified by the photographic film identification information are recorded;

a memory means for memorizing the inputted photographic film identification information and the inputted print-specification information in a correlated condition between them;

a verifying means for verifying with the memorized photographic film identification information a photographic film identification information provided on a photographic film accommodating container in which a photographic film identified by the photographic film identification information is accommodated;

a reading means for reading the print-specification information corresponding to the verified photographic film identification information from the memory means; and a recording means for recording the read print-specification information on the photographic film accommodated in the photographic film accommodating container.

According to the photographic processing system of Item 23, an event in which the destination of the photographic film at which the photographic film is printed to a photographic paper under the requested print-specification in the photographic processing system can not be determined can be avoided, and an automation of the photographic processing system can be enhanced.

Item 25

The photographic processing system described in Item 24 is characterized by comprising a pasting means for pasting the sheet on which the print-specification information is written onto the photographic film accommodated in the photographic film accommodating container.

According to the photographic processing system of Item 25, the read print-specification information is surely recorded on the photographic film accommodated in the photographic film accommodating container.

Item 26

The photographic processing system described in either one of Items 17 to 25 is characterized by comprising a recording means for recording an exposure condition on a photographic film which is exposed on the exposure condition by the exposing apparatus.

According to the photographic processing system of Item 26, when the photographic film is exposed at the following time, since the photographic film can be exposed on the exposure condition recorded by the recording means, a print obtained at the following time can be finished as same as that obtained at the current exposing process.

Item 27

The photographic processing system described in Item 26 is characterized by comprising a pasting means for pasting the sheet on which the exposure condition is written on the photographic film.

According to the photographic processing system of Item 27, the exposure condition is surely recorded on the photographic film.

Item 28

The photographic processing system described in Item 15 is characterized in that the photographic film is a developed short-length photographic film.

According to the photographic processing system of Item 28, in the photographic processing system in which the photographic film is a developed short photographic film, an event in which the destination of the photographic film at which the photographic film is printed to a photographic paper under the requested print-specification in the photographic processing system can not be determined can be avoided, and an automation of the photographic processing system can be enhanced.

Item 29

The photographic processing system described in either one of Items 14, 15, and 28 is characterized in that the photographic processing system comprises a sorting apparatus for sorting the photographic film for each print-specification and an exposing apparatus capable of exposing an image of the photographic film to a photographic paper under the print-specification.

According to the photographic processing system of Item 29, in the photographic processing system comprising a sorting apparatus for sorting the photographic film for each print-specification and an exposing apparatus capable of exposing an image of the photographic film to a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 30

The photographic processing system described in Item 29 is characterized in that the sorting apparatus for sorting for each print-specification comprises a discriminating means for discriminating the print-specification.

According to the photographic processing system of Item 30, since the sorting apparatus for sorting for each print-specification is provided with the discriminating means for discriminating the print-specification, the print-specification of the photographic film can be surely discriminated and the photographic film can be sorted.

Item 31

The photographic processing system described in Item 29 or 30 is characterized in that a photographic film is sorted for each print-specification by the sorting apparatus and an image of the photographic film which is sorted for each print-specification is exposed by the exposing apparatus capable of exposing the image onto a photographic paper under the print-specification.

According to the photographic processing system of Item 31, in the photographic processing system in which a photographic film is sorted for each print-specification by the sorting apparatus and an image of the photographic film which is sorted for each print-specification is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided; and an automation of the photographic processing system can be enhanced.

Item 32

The photographic processing system described in Items 29 to 31 is characterized in that the exposing apparatus is provided for each print-specification.

According to the photographic processing system of Item 32, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 33

The photographic processing system described in either one of Items 14, 15, and 28 to 32 is characterized by comprising an inputting means for inputting the photographic film identification information and the print-specification information of a photographic film which is identified by the photographic film identification information, based on a sheet on which the photographic film identification information and the print-specification information of the photographic film which is identified by the photographic film identification information are recorded;

a memory means for memorizing the inputted photographic film identification information and the inputted print-specification information in a correlated condition between them;

a verifying means for verifying with the memorized photographic film identification information a photographic film identification information provided on a photographic film accommodating bag or a photographic film accommodating bag package, wherein a photographic film identified by the photographic film identification information is accommodated in the photographic film accommodating bag or the the photographic film accommodating bag packaged by the photographic film accommodating bag package;

a reading means for reading the print-specification information corresponding to the verified photographic film identification information from the memory means; and a recording means for recording the read print-specification information on the photographic film accommodated in the photographic film accommodating bag or the photographic film accommodating bag packaged in the photographic film accommodating bag package.

According to the photographic processing system of Item 33, an event in which the destination of the photographic film at which the photographic film is printed to a photographic paper under the requested print-specification in the photographic processing system can not be determined can be avoided, and an automation of the photographic processing system can be enhanced.

Item 34

The photographic processing system described in either one of Items 14, 15, and 28 to 32 is characterized by comprising an inputting means for inputting a photographic film identification information, a print-specification information of a photographic film, ordered-frame-specifying information for the photographic film and print-number information for the ordered frame, based on a sheet on which the photographic film identification information and the print-specification information of the photographic film which is identified by the photographic film identification information are recorded and a photographic film accommodating bag package on which the photographic film identification information, the ordered-frame-specifying information for the photographic film and print-number information for the ordered frame are recorded or based on a sheet on which the photographic film identification information and the print-specification information of the photographic film which is identified by the photographic film identification information are recorded, a photographic film accommodating bag on which the photographic film identification information of the photographic film and a photographic film accommodating bag package on which ordered-frame-specifying information for the photographic film and print-number information for the ordered frame are recorded;

a memory means for memorizing the inputted photographic film identification information, the inputted print-specification information, the inputted ordered-frame-specifying information and the inputted print number information for the ordered frame in a correlated condition between them;

a verifying means for verifying with the memorized photographic film identification information a photographic film identification information recorded on a photographic film accommodating bag or a photographic film accommodating bag package in which a photographic film identified by the photographic film identification information is accommodated;

a reading means for reading the print-specification information, the ordered-frame-specifying information and print-number information for the ordered frame corresponding to the verified photographic film identification information from the memory means; and a recording means for recording the read print-specification information, the ordered-frame-specifying information and print-number information for the ordered frame on the photographic film accommodated in the photographic film accommodating bag or the photographic film accommodating bag package.

According to the photographic processing system of Item 34, an event in which the destination of the photographic film at which the photographic film is printed to a photographic paper under the requested print-specification in the photographic processing system can not be determined can be avoided, and an automation of the photographic processing system can be enhanced.

Item 35

The photographic processing system described in either one of Items 14, 15, and 28 to 32 is characterized by comprising an inputting means for inputting a photographic film identification information, print-specification information of a photographic film, ordered-frame-specifying information for the photographic film and print-number information for the ordered frame, based on a sheet on which the photographic film identification information, the print-specification information of the photographic film which is identified by the photographic film identification information, the ordered-frame-specifying information for the photographic film and print-number information for the ordered frame are recorded;

a memory means for memorizing the inputted photographic film identification information, the inputted print-specification information, the inputted ordered-frame-specifying information for the photographic film and the inputted print number information for the ordered frame in a correlated condition between them;

a verifying means for verifying with the memorized photographic film identification information a photographic film identification information recorded on a photographic film accommodating bag or a photographic film accommodating bag package in which a photographic film identified by the photographic film identification information is accommodated;

a reading means for reading the print-specification information, the ordered-frame-specifying information for the photographic film and print-number information for the ordered frame corresponding to the verified photographic film identification information from the memory means; and a recording means for recording the read print-specification information, the read ordered-frame-specifying information for the photographic film and the read print-number information for the ordered frame on the photographic film accommodated in the photographic film accommodating bag.

According to the photographic processing system of Item 35, an event in which the destination of the photographic film at which the photographic film is printed to a photographic paper under the requested print-specification in the photographic processing system can not be determined can be avoided, and an automation of the photographic processing system can be enhanced.

Item 36

The photographic processing system described in either one of Items 29 to 35 is characterized in that an image of the photographic film is exposed on a photographic paper by the exposing apparatus on an exposure condition on which the photographic film is initially exposed after a photographic film is developed.

According to the photographic processing system of Item 36, after a photographic film is developed, since the photographic film can be exposed on the exposure condition on which the photographic film is initially exposed, a print obtained by the following exposure can be finished as same as that obtained by the initial exposure.

Item 37

The photographic processing system described in Item 36 is characterized by comprising a recording means for recording on a photographic film or on a photographic film accommodating bag an exposure condition on which the photographic film is initially exposed after the photographic film is developed.

According to the photographic processing system of Item 37, after a photographic film is developed, since the photographic film can be exposed on the exposure condition on which the photographic film is initially exposed, a print obtained by the following exposure can be finished as same as that obtained by the initial exposure.

Item 38

The photographic processing system described in Item 37 is characterized by comprising a pasting means for pasting on a photographic film or on a photographic film accommodating bag a sheet on which an exposure condition on which the photographic film is initially exposed after the photographic film is developed is written.

According to the photographic processing system of Item 38, an exposure condition on which the photographic film is initially exposed after a photographic film is developed is surely written on a photographic film or on a photographic film accommodating bag.

Item 39

The photographic processing system described in either one of Items 14 to 38 is characterized in that the print-specification information is print-size information and/or surface quality information.

According to the photographic processing system of Item 39, in the photographic processing system in which the print-specification information is print-size information and/or surface quality information, an event in which the destination of the photographic film at which the photographic film is printed to a photographic paper under the requested print-specification in the photographic processing system can not be determined can be avoided, and an automation of the photographic processing system can be enhanced.

Item 40

The photographic processing system described in either one of Items 14 to 39 is characterized in that the print-specification information is a width of a long-length photographic paper.

According to the photographic processing system of Item 40, in the photographic processing system in which the print-specification information is a width of a long-length photographic paper, an event in which the destination of the photographic film at which the photographic film is printed to a photographic paper under the requested print-specification in the photographic processing system can not be determined can be avoided, and an automation of the photographic processing system can be enhanced.

Item 41

The photographic processing system described in Item 40 is characterized in that the print-specification information is E (economy) print size or L (large) print size.

According to the photographic processing system of Item 41, in the photographic processing system in which the print-specification information is E (economy) print size or L (large) print size, an event in which the destination of the photographic film at which the photographic film is printed to a photographic paper under the requested print-specification in the photographic processing system can not be determined can be avoided, and an automation of the photographic processing system can be enhanced.

Item 42

The photographic processing system described in Item 37 is characterized in that the surface quality information is information indicating a glossy type, or a silky type.

According to the photographic processing system of Item 42, in the photographic processing system in which the surface quality information is information indicating a glossy type, or a silty type, an event in which the destination of the photographic film at which the photographic film is printed to a photographic paper under the requested print-specification in the photographic processing system can not be determined can be avoided, and an automation of the photographic processing system can be enhanced.

Item 43

The photographic processing system described in either one of Items 1 to 42 is characterized by comprising a pasting means for pasting on the photographic film a sheet on which photographic film destination determining information is written.

According to the photographic processing system of Item 43, the photographic film destination determining information is surely recorded on the photographic film.

Item 44

A photographic processing system is characterized by comprising a memory means for memorizing in a correlated condition photographic film identification information and print-specification information which are inputted by an inputting means for inputting the identification information and the print-specification information;

a reading means for reading the print-specification information corresponding to the photographic film identification information from the memory means, based on the photographic film identification information provided on a photographic film accommodating container in which the photographic film is accommodated; and a recording means for recording the read print-specification information on the photographic film accommodated in the photographic film accommodating container, wherein a print is obtained in accordance with the print-specification based on the print-specification information recorded on the photographic film.

According to the photographic processing system of Item 44, an event in which the destination of the photographic film at which the photographic film is printed to a photographic paper under the requested print-specification in the photographic processing system can not be determined due to the separation of the print-specification information from the photographic film can be avoided, and an automation of the photographic processing system can be enhanced.

Item 45

The photographic processing system described in Item 44 is characterized in that the photographic processing system comprises a verifying means for verifying with the memorized photographic film identification information a photographic film identification information recorded on a photographic film accommodating container in which the photographic film is accommodated.

According to the photographic processing system of Item 45, since the photographic processing system comprises the verifying means, an event in which the destination of the photographic film in the photographic processing system can not be determined can be avoided, and an automation of the photographic processing system can be enhanced.

Item 46

The photographic processing system described in Items 44 to 45 is characterized in that the print-specification information is print-size information and/or surface quality information.

According to the photographic processing system of Item 46, in the photographic processing system in which the print-specification information is print-size information and/or surface quality information, an event in which the destination of the photographic film at which the photographic film is printed to a photographic paper under the requested print-specification in the photographic processing system can not be determined can be avoided, and an automation of the photographic processing system can be enhanced.

Item 47

The photographic processing system described in Item 44 or 45 is characterized in that the print-specification information is a width of a long-length photographic paper.

According to the photographic processing system of Item 47, in the photographic processing system in which the print-specification information is a width of a long-length photographic paper, an event in which the destination of the photographic film at which the photographic film is printed to a photographic paper under the requested print-specification in the photographic processing system can not be determined can be avoided, and an automation of the photographic processing system can be enhanced.

Item 48

The photographic processing system described in Item 47 is characterized in that the print-specification information is E (economy) print size or L (large) print size.

According to the photographic processing system of Item 48, in the photographic processing system in which the print-specification information is E (economy) print size or L (large) print size, an event in which the destination of the photographic film at which the photographic film is printed to a photographic paper under the requested print-specification in the photographic processing system can not be determined can be avoided, and an automation of the photographic processing system can be enhanced.

Item 49

The photographic processing system described in Item 46 is characterized in that the surface quality information is information indicating a glossy type, or a silky type.

According to the photographic processing system of Item 49, in the photographic processing system in which the surface quality information is information indicating a glossy type, or a silky type, an event in which the destination of the photographic film at which the photographic film is printed to a photographic paper under the requested print-specification in the photographic processing system can not be determined can be avoided, and an automation of the photographic processing system can be enhanced.

Item 50

The photographic processing system described in Items 44 to 49 is characterized in that the recording means records the print-specification information on a photographic film accommodated in the photographic film accommodating container by pasting a sheet on which the print-specification information is written on the photographic film.

According to the photographic processing system of Item 50, the photographic film destination determining information is surely recorded on the photographic film accommodated in the photographic film accommodating container.

Item 51

A photographic processing system is characterized by comprising a memory means for memorizing in a correlated form photographic film identification information and print-specification information which are inputted by an inputting means for inputting the identification information and the print-specification information;

a recording means for recording photographic film identification information on the photographic film accommodated in the photographic film accommodating container, a reading means for reading the print-specification information which is memorized in the memory means and corresponds to the photographic film identification information, based on the photographic film identification information recorded on the photographic film; and wherein a print is obtained in accordance with the print-specification based on the print-specification information read by the reading means.

According to the photographic processing system of Item 51, an event in which the destination of the photographic film at which the photographic film is printed to a photographic paper under the requested print-specification in the photographic processing system can not be determined can be avoided, and an automation of the photographic processing system can be enhanced.

Item 52

The photographic processing system described in Item 51 is characterized in that the photographic processing system comprises a verifying means for verifying with the memorized photographic film identification information a photographic film identification information recorded on a photographic film accommodating container in which the photographic film is accommodated.

According to the photographic processing system of Item 52, since the photographic processing system comprises the verifying means, an event in which the destination of the photographic film in the photographic processing system can not be determined can be avoided, and an automation of the photographic processing system can be enhanced.

Item 53

In a photographic processing system at least provided with a plurality of automatic negative film developing apparatus for conducting negative film development, a plurality of automatic photographic paper developing apparatus for conducting photographic paper development, and one or more of packaging apparatus, the following questions are determined based on processing condition information carried by a negative film to be processed or a negative film cartridge: whether the negative film development is conducted, which of the negative film developing apparatus is used if the negative film development is conducted, whether the photographic paper development is conducted, and which of the photographic paper developing apparatus is used if the photographic paper development is conducted.

According to the photographic processing system of Item 53, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

Item 54

In a photographic processing system at least provided with a plurality of automatic negative film developing apparatus for conducting negative film development, a plurality of automatic photographic paper developing apparatus for conducting photographic paper development, and one or more of packaging apparatus, the following questions are determined based on processing condition information memorized in correspondence with the film identification information carried by a negative film to be processed or a negative film cartridge: whether the negative film development is conducted, which of the negative film developing apparatus is used if the negative film development is conducted, whether the photographic paper development is conducted, and which of the photographic paper developing apparatus is used if the photographic paper development is conducted.

According to the photographic processing system of Item 54, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

Item 55

In a photographic processing system provided with an automatic sorting apparatus, a plurality of automatic negative film developing apparatus for conducting negative film development of one or more, a plurality of automatic photographic paper developing apparatus for conducting photographic paper development, and one or more of packaging apparatus, an automatic conveying passage is provided between the automatic sorting apparatus and the automatic negative film developing apparatus, between the automatic negative film developing apparatus and the automatic photographic paper developing apparatus, and between the automatic photographic paper developing apparatus and the automatic sorting apparatus respectively, each automatic conveying passage automatically conveys the photographic film to the next process based on the destination determining information of the film to be processed.

According to the photographic processing system of Item 55, in the photographic processing system provided with an automatic sorting apparatus, a plurality of automatic negative film developing apparatus for conducting negative film development of one or more, a plurality of automatic photographic paper developing apparatus for conducting photographic paper development, and one or more of packaging apparatus, the photographic film can be automatically conveyed by the automatic conveying passage to the next process based on the destination determining information of the film to be processed, thereby attaining automation of photographic processing in a laboratory.

Item 56

In a method of determining a destination of each of plural photographic films having a different destination from each other in a photographic processing system for processing a photographic film for each order without splicing it to other photographic film, the photographic film destination determining method is characterized in that a destination of each of plural photographic films is determined based on photographic film destination determining information recorded on a photographic film to be processed.

According to the photographic film destination determining method of Item 56, in a photographic processing system for processing a photographic film for each order without splicing it to other photographic film, since a destination of each of plural photographic films having a different destination from each other is determined based on photographic film destination determining information recorded on a photographic film to be processed, an event in which the destination of the photographic film can not be determined due to the separation of the photographic film destination determining information from the photographic film can be avoided, and an automation of the photographic processing system can be enhanced.

Item 57

The photographic film destination determining method described in Item 56. is characterized in that the photographic film destination determining information is return-destination specifying information.

According to the photographic film destination determining method of Item 57, an event in which the destination of the photographic film can not be determined due to the separation of the return-destination specifying information of the photographic film from the photographic film can be avoided, and an automation of the photographic processing system can be enhanced.

Item 58

The photographic film destination determining method described in Item 57 is characterized in that the return-destination specifying information is information specifying a receiving place of the photographic film and/or the owner of the photographic film.

According to the photographic film destination determining method of Item 58, an event in which the destination of the photographic film can not be determined due to the separation of the information specifying a receiving place of the photographic film and/or the owner of the photographic film from the photographic film can be avoided, and an automation of the photographic processing system can be enhanced.

Item 59

The photographic film destination determining method described in Item 57 or 58 is characterized by discriminating by a discriminating means based on the return-destination specifying information a return-destination to which the photographic film recorded with the return-destination specifying information is returned.

According to the photographic film destination determining method of Item 59, since the photographic processing system is provided with the discriminating means, the return-destination to which the photographic film recorded the return-destination specifying information can be surely discriminated.

Item 60

The photographic film destination determining method described in Items 57 to 59 is characterized in that the photographic processing system comprises an exposing apparatus for exposing an image of the photographic film to a photographic paper and a sorting apparatus for sorting the photographic film for each return-destination.

According to the photographic film destination determining method of Item 60, in the photographic processing system comprising an exposing apparatus for exposing an image of the photographic film to a photographic paper and a sorting apparatus for sorting the photographic film for each return-destination, an event in which the destination of the photographic film can not be determined can be avoided, and an automation of the photographic processing system can be enhanced.

Item 61

The photographic film destination determining method described in Item 57 to 60 is characterized in that the photographic processing system comprises a developing apparatus for developing the photographic film and a sorting apparatus for sorting the photographic film for each return-destination.

According to the photographic film destination determining method of Item 61, in the photographic processing system comprising a developing apparatus for developing the photographic film and a sorting apparatus for sorting the photographic film for each return-destination, an event in which the destination of the photographic film can not be determined can be avoided, and an automation of the photographic processing system can be enhanced.

Item 62

The photographic film destination determining method described in Item 57 to 59 is characterized in that the photographic processing system comprises a developing apparatus for developing the photographic film, an exposing apparatus for exposing an image of the photographic film to a photographic paper and a sorting apparatus for sorting the photographic film for each return-destination.

According to the photographic film destination determining method of Item 62, in the photographic processing system comprising a developing apparatus for developing the photographic film, an exposing apparatus for exposing an image of the photographic film to a photographic paper and a sorting apparatus for sorting the photographic film for each return-destination, an event in which the destination of the photographic film can not be determined can be avoided, and an automation of the photographic processing system can be enhanced.

Item 63

The photographic film destination determining method described in Item 60 to 62 is characterized in that the sorting apparatus comprises a discriminating means for discriminating the return-destination.

According to the photographic film destination determining method of Item 63, since the sorting apparatus for sorting for each return-destination is provided with the discriminating means, the return-destination-can be surely discriminated.

Item 64

The photographic film destination determining method described in Item 60 to 63 is characterized in that the sorting apparatus sorts a photographic film exposed by the exposing apparatus before returning it to the return-destination.

According to the photographic film destination determining method of Item 64, in the photographic processing system in which the sorting apparatus sorts a photographic film exposed by the exposing apparatus before returning it to the return-destination, an event in which the destination of the photographic film can not be determined can be avoided, and an automation of the photographic processing system can be enhanced.

Item 65

The photographic film destination determining method described in Item 64 is characterized in that the photographic film is a developed short-length photographic film.

According to the photographic film destination determining method of Item 65, in the photographic processing system in which the photographic film is a developed short photographic film, an event in which the destination of the photographic film can not be determined can be avoided, and an automation of the photographic processing system can be enhanced.

Item 66

The photographic film destination determining method described in Items 61 to 63 is characterized in that the sorting apparatus sorts a photographic film developed by the developing apparatus before returning it to the return-destination.

According to the photographic film destination determining method of Item 66, in the photographic processing system in which the sorting apparatus sorts a photographic film developed by the developing apparatus before returning it to the return-destination, an event in which the destination of the photographic film can not be determined can be avoided, and an automation of the photographic processing system can be enhanced.

Item 67

The photographic film destination determining method described in Item 62 to 63 is characterized in that an image of a photographic film developed by the developing apparatus is exposed on a photographic paper by the exposing apparatus before returning it to the return-destination and the sorting apparatus sorts the exposed photographic film before returning it to the return-destination.

According to the photographic film destination determining method of Item 67, in the photographic processing system in which an image of a photographic film developed by the developing apparatus is exposed on a photographic paper by the exposing apparatus before returning it to the return-destination and the sorting apparatus sorts the exposed photographic film before returning it to the return-destination, an event in which the destination of the photographic film can not be determined can be avoided, and an automation of the photographic processing system can be enhanced.

Item 68

The photographic film destination determining method described in Item 64 is characterized in that the photographic film is a long-length photographic film.

According to the photographic film destination determining method of Item 68, in the photographic processing system in which the photographic film is a long-length photographic film, an event in which the destination of the photographic film can not be determined can be avoided, and an automation of the photographic processing system can be enhanced.

Item 69

The photographic film destination determining method described in Item 56. is characterized in that the photographic film destination determining information is print-specification information.

According to the photographic film destination determining method of Item 69, an event in which the destination of the photographic film at which the photographic film is printed to a photographic paper under the requested print-specification in the photographic processing system can not be determined due to the separation of the print-specification information of the photographic film from the photographic film can be avoided, and an automation of the photographic processing system can be enhanced.

Item 70

The photographic film destination determining method described in Item 69 is characterized by discriminating by a discriminating means based on the print-specification information a print-specification under which a photographic film recorded with the print-specification information is exposed.

According to the photographic film destination determining method of Item 70, since the photographic processing system is provided with the discriminating means, the print-specification under which a photographic film recorded with the print-specification information is exposed can be surely discriminated.

Item 71

The photographic film destination determining method described in Item 70 is characterized in that the photographic film is a long-length photographic film.

According to the photographic film destination determining method of Item 71, in the photographic processing system in which the photographic film is a long-length photographic film, an event in which the destination of the photographic film at which the photographic film is printed to a photographic paper under the requested print-specification in the photographic processing system can not be determined can be avoided, and an automation of the photographic processing system can be enhanced.

Item 72

The photographic film destination determining method described in Item 69 to 71 is characterized in that the photographic processing system comprises a developing apparatus for developing the photographic film, a sorting apparatus for sorting the photographic film for each print-specification and an exposing apparatus for exposing an image of the photographic film to a photographic paper under the print-specification.

According to the photographic film destination determining method of Item 72, in the photographic processing system comprising a developing apparatus for developing the photographic film, a sorting apparatus for sorting the photographic film for each print-specification and an exposing apparatus for exposing an image of the photographic film to a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 73

The photographic film destination determining method described in Item 72 is characterized in that the sorting apparatus for sorting for each print-specification comprises a discriminating means for discriminating the print-specification.

According to the photographic film destination determining method of Item 73, since the sorting apparatus for sorting for each print-specification is provided with the discriminating means for discriminating the print-specification, the print-specification of the photographic film can be surely discriminated and the photographic film can be sorted.

Item 74

The photographic film destination determining method described in Item 72 to 73 is characterized in that a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification.

According to the photographic film destination determining method of Item 74, in the photographic processing system in which a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 75

The photographic film destination determining method described in either one of Items 72 to 74 is characterized in that the developing apparatus is provided for each print-specification.

According to the photographic film destination determining method of Item 75, in the photographic processing system in which the developing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 76

The photographic film destination determining method described in either one of Items 72 to 75 is characterized in that the exposing apparatus is provided for each print-specification.

According to the photographic film destination determining method of Item 76, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 77

The photographic film destination determining method described in Item 72 or 73 is characterized in that a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification.

According to the photographic film destination determining method of Item 77, in the photographic processing system in which a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 78

The photographic film destination determining-method described in either one of Items 72, 73, and 77 is characterized in that the exposing apparatus is provided for each print-specification.

According to the photographic film destination determining method of Item 78, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced Item 79

The photographic film destination determining method described in either one of Items 69 to 78 is characterized by comprising inputting photographic film identification information and print-specification information of a photographic film which is identified by the photographic film identification information, based on a sheet on which the photographic film identification information and the print-specification information of the photographic film which is identified by the photographic film identification information are recorded;

memorizing the inputted photographic film identification information and the inputted print-specification information in a correlated condition between them in a memory means;

verifying with the memorized photographic film identification information a photographic film identification information provided on a photographic film accommodating container in which a photographic film identified by the photographic film identification information is accommodated;

reading the print-specification information corresponding to the verified photographic film identification information from the memory means; and recording the read print-specification information on the photographic film accommodated in the photographic film accommodating container.

According to the photographic film destination determining method of Item 79, an event in which the destination of the photographic film at which the photographic film is printed to a photographic paper under the requested print-specification in the photographic processing system can not be determined can be avoided, and an automation of the photographic processing system can be enhanced.

Item 80

The photographic film destination determining method described in Item 79 is characterized by pasting the sheet on which the print-specification information is written on the photographic film accommodated in the photographic film accommodating container, thereby recording the read print-specification information on the photographic film accommodated in the photographic film accommodating container.

According to the photographic film destination determining method of Item 80, the read print-specification information is surely recorded on the photographic film accommodated in the photographic film accommodating container.

Item 81

The photographic film destination determining method described in either one of Items 72 to 80 is characterized by recording an exposure condition on a photographic film which is exposed on the exposure condition by the exposing apparatus.

According to the photographic film destination determining method of Item 81, when the photographic film is exposed at the following time, since the photographic film can be exposed on the exposure condition recorded by the recording means, a print obtained at the following time can be finished as same as that obtained at the current exposing process.

Item 82

The photographic film destination determining method described in Item 81 is characterized by pasting the sheet on which the exposure condition is written on the photographic film, thereby recording the exposure condition on the photographic film which is exposed on the exposure condition by the exposing apparatus.

According to the photographic film destination determining method of Item 82, the exposure condition is surely recorded on the photographic film.

Item 83

The photographic film destination determining method described in Item 70 is characterized in that the photographic film is a developed short-length photographic film.

According to the photographic film destination determining method of Item 83, in the photographic processing system in which the photographic film is a developed short photographic film, an event in which the destination of the photographic film at which the photographic film is printed to a photographic paper under the requested print-specification in the photographic processing system can not be determined can be avoided, and an automation of the photographic processing system can be enhanced.

Item 84

The photographic film destination determining method described in either one of Items 69, 70, and 83 is characterized in that the photographic processing system comprises a sorting apparatus for sorting the photographic film for each print-specification and an exposing apparatus capable of exposing an image of the photographic film to a photographic paper under the print-specification.

According to the photographic film destination determining method of Item 84, in the photographic processing system comprising a sorting apparatus for sorting the photographic film for each print-specification and an exposing apparatus capable of exposing an image of the photographic film to a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 85

The photographic film destination determining method described in Item 84 is characterized in that the sorting apparatus for sorting for each print-specification comprises a discriminating means for discriminating the print-specification.

According to the photographic film destination determining method of Item 85, since the sorting apparatus for sorting for each print-specification is provided with the discriminating means for discriminating the print-specification, the print-specification of the photographic film can be surely discriminated and the photographic film can be sorted.

Item 86

The photographic film destination determining method described in Item 84 or 85 is characterized in that a photographic film is sorted for each print-specification by the sorting apparatus and an image of the photographic film which is sorted for each print-specification is exposed by the exposing apparatus capable of exposing the image onto a photographic paper under the print-specification.

According to the photographic film destination determining method of Item 85, in the photographic processing system in which a photographic film is sorted for each print-specification by the sorting apparatus and an image of the photographic film which is sorted for each print-specification is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 87

The photographic film destination determining method described in Item 84 to 86 is characterized in that the exposing apparatus is provided for each print-specification.

According to the photographic film destination determining method of Item 87, in the photographic processing system in which the exposing apparatus is provided for each print-specification, an event in which the destination of the photographic film at which the photographic-film is printed to a photographic paper under the requested print-specification in the photographic processing system can not be determined can be avoided, and an automation of the photographic processing system can be enhanced.

Item 88

The photographic film destination determining method described in either one of Items 69, 70, and 83 to 87 is characterized by comprising

- inputting photographic film identification information and print-specification information of a photographic film which is identified by the photographic film identification information, based on a sheet on which the photographic film identification information and the print-specification information of the photographic film which is identified by the photographic film identification information are recorded;
- memorizing the inputted photographic film identification information and the inputted print-specification information in a correlated condition between them in a memory means;
- verifying with the memorized photographic film identification information a photographic film identification information provided on a photographic film accommodating bag or a photographic film accommodating bag package, wherein a photographic film identified by the photographic film identification information is accommodated in the photographic film accommodating bag or the photographic film accommodating bag packaged in the photographic film accommodating bag package;
- reading the print-specification information corresponding to the verified photographic film identification information from the memory means; and
- recording the read print-specification information on the photographic film accommodated in the photographic film accommodating bag or in the photographic film accommodating bag packaged in the photographic film accommodating bag package.

According to the photographic film destination determining method of Item 88, an event in which the destination of the photographic film at which the photographic film is printed to a photographic paper under the requested print-specification in the photographic processing system can not be determined can be avoided, and an automation of the photographic processing system can be enhanced.

Item 89

The photographic film destination determining method described in either one of Items 69, 70, and 83 to 87 is characterized by comprising

- inputting photographic film identification information, print-specification information of a photographic film, ordered-frame-specifying information for the photographic film and print-number information for the ordered frame, based on a sheet on which the photographic film identification information and the print-specification information of the photographic film which is identified by the photographic film identification information are recorded and a photographic film accommodating bag package on which the photographic film identification information, the ordered-frame-specifying information for the photographic film and print-number information for the ordered frame are recorded or based on a sheet on which the photographic film identification information and the print-specification information of the photographic film which is identified by the photographic film identification information are recorded, a photographic film accommodating bag on which the photographic film identification information of the photographic film is recorded and a photographic film accommodating bag package on which ordered-frame-specifying information for the photographic film and print-number information for the ordered frame are recorded;
- memorizing the inputted photographic film identification information, the inputted print-specification information, the inputted ordered-frame-specifying information and the inputted print number information for the ordered frame in a correlated condition between them in a memory means;
- verifying with the memorized photographic film identification information a photographic film identification information provided on a photographic film accommodating bag or a photographic film accommodating bag package;
- reading the print-specification information, the ordered-frame-specifying information and the print-number information for the ordered frame corresponding to the verified photographic film identification information from the memory means; and
- recording the read print-specification information, the ordered-frame-specifying information and the print-number information for the ordered frame on the photographic film accommodated in the photographic film accommodating bag.

According to the photographic film destination determining method of Item 89, an event in which the destination of the photographic film at which the photographic film is printed to a photographic paper under the requested print-specification in the photographic processing system can not be determined can be avoided, and an automation of the photographic processing system can be enhanced.

Item 90

The photographic film destination determining method described in either one of Items 69, 70, and 83 to 87 is characterized by comprising

- inputting photographic film identification information, print-specification information of a photographic film, ordered-frame-specifying information for the photographic film and the print-number information for the ordered frame, based on a sheet on which the photographic film identification information, the print-specification information of the photographic film which is identified by the photographic film identification information, the ordered-frame-specifying information for the photographic film and the print-number information for the ordered frame are recorded, or based on a photographic film containing bag package of the photographic film on which the photographic film identification information, the print-specification information of the photographic film which is identified by the photographic film identification information, the ordered-frame-specifying information for the photographic film and the print-number information for the ordered frame are recorded;

memorizing the inputted photographic film identification information, the inputted print-specification information, the inputted ordered-frame-specifying information for the photographic film and the inputted print number information for the ordered frame in a correlated condition between them in a memory means;

verifying with the memorized photographic film identification information a photographic film identification information recorded on a photographic film accommodating bag of the photographic film or a photographic film accommodating bag package of the photographic film;

reading the print-specification information, the ordered-frame-specifying information for the photographic film and the print-number information for the ordered frame corresponding to the verified photographic film identification information from the memory means; and recording the read print-specification information, the read ordered-frame-specifying information for the photographic film and the read print-number information for the ordered frame on the photographic film accommodated in the photographic film accommodating bag.

According to the photographic film destination determining method of Item 90, an event in which the destination of the photographic film at which the photographic film is printed to a photographic paper under the requested print-specification in the photographic processing system can not be determined can be avoided, and an automation of the photographic processing system can be enhanced.

Item 91

The photographic film destination determining method described in either one of Items 84 to 90 is characterized in that an image of the photographic film is exposed on a photographic paper by the exposing apparatus on an exposure condition on which the photographic film is initially exposed after a photographic film is developed.

According to the photographic film destination determining method of Item 91, after a photographic film is developed, since the photographic film can be exposed on the exposure condition on which the photographic film is initially exposed, a print obtained by the following exposure can be finished as same as that obtained by the initial exposure.

Item 92

The photographic film destination determining method described in Item 91 is characterized by recording on a photographic film or on a photographic film accommodating bag an exposure condition on which the photographic film is initially exposed after the photographic film is developed.

According to the photographic film destination determining method of Item 92, after a photographic film is developed, since the photographic film can be exposed on the exposure condition on which the photographic film is initially exposed, a print obtained by the following exposure can be finished as same as that obtained by the initial exposure.

Item 93

The photographic film destination determining method described in Item 92 is characterized by pasting on a photographic film or on a photographic film accommodating bag a sheet on which an exposure condition on which the photographic film is initially exposed after the photographic film is developed is written, thereby recording on a photographic film or on a photographic film accommodating bag an exposure condition on which the photographic film is initially exposed after the photographic film is developed.

According to the photographic film destination determining method of Item 93, an exposure condition on which the photographic film is initially exposed after a photographic film is developed is surely recorded on a photographic film or on a photographic film accommodating bag.

Item 94

The photographic film destination determining method described in either one of Items 69 to 93 is characterized in that the print-specification information is print-size information and/or surface quality information.

According to the photographic film destination determining method of Item 94, in the photographic processing system in which the print-specification information is print-size information and/or surface quality information, an event in which the destination of the photographic film at which the photographic film is printed to a photographic paper under the requested print-specification in the photographic processing system can not be determined can be avoided, and an automation of the photographic processing system can be enhanced.

Item 95

The photographic film destination determining method described in either one of Items 69 to 94 is characterized in that the print-specification information is a width of a long-length photographic paper.

According to the photographic film destination determining method of Item 95, in the photographic processing system in which the print-specification information is a width of a long-length photographic paper, an event in which the destination of the photographic film at which the photographic film is printed to a photographic paper under the requested print-specification in the photographic processing system can not be determined can be avoided, and an automation of the photographic processing system can be enhanced.

Item 96

The photographic film destination determining method described in Item 95 is characterized in that the print-specification information is E (economy) print size or L (large) print size.

According to the photographic film destination determining method of Item 96, in the photographic processing system in which the print-specification information is E (economy) print size or L (large) print size, an event in which the destination of the photographic film at which the photographic film is printed to a photographic paper under the requested print-specification in the photographic processing system can not be determined can be avoided, and an automation of the photographic processing system can be enhanced.

Item 97

The photographic film destination determining method described in Item 94 is characterized in that the surface quality information is information indicating a glossy type, or a silky type.

According to the photographic film destination determining method of Item 97, in the photographic processing system in which the surface quality information is information indicating a glossy type, or a silky type, an event in which the destination of the photographic film at which the photographic film is printed to a photographic paper under the requested print-specification in the photographic processing system can not be determined can be avoided, and an automation of the photographic processing system can be enhanced.

Item 98

The photographic film destination determining method described in either one of Items 56 to 97 is characterized by comprising a pasting means for pasting on the photographic film a sheet on which photographic film destination determining information is written.

According to the photographic film destination determining method of Item 98, the photographic film destination determining information is surely recorded on the photographic film.

Item 99

A photographic processing system is characterized by comprising

- memorizing in a correlated condition photographic film identification information and print-specification information which are inputted by an inputting means for inputting the identification information and the print-specification information;
- reading the print-specification information corresponding to the photographic film identification information from the memory means, based on the photographic film identification information provided on a photographic film accommodating container in which the photographic film is accommodated; and
- recording the read print-specification information on the photographic film accommodated in the photographic film accommodating container, wherein a print is obtained in accordance with the print-specification based on the print-specification information recorded on the photographic film.

According to the photographic film destination determining method of Item 99, an event in which the destination of the photographic film at which the photographic film is printed to a photographic paper under the requested print-specification in the photographic processing system can not be determined due to the separation of the print-specification information from the photographic film can be avoided, and an automation of the photographic processing system can be enhanced.

Item 100

The photographic film destination determining method described in Item 99 is characterized by verifying with the memorized photographic film identification information a photographic film identification information recorded on a photographic film accommodating container in which the photographic film is accommodated.

According to the photographic film destination determining method of Item 100, since the photographic processing system comprises the verifying means, an event in which the destination of the photographic film in the photographic processing system can not be determined can be surely avoided, and an automation of the photographic processing system can be enhanced.

Item 101

The photographic film destination determining method described in Item 99 or 100 is characterized in that the print-specification information is print-size information and/or surface quality information.

According to the photographic film destination determining method of Item 101, in the photographic processing system in which the print-specification information is print-size information and/or surface quality information, an event in which the destination of the photographic film at which the photographic film is printed to a photographic paper under the requested print-specification in the photographic processing system can not be determined can be avoided, and an automation of the photographic processing system can be enhanced.

Item 102

The photographic film destination determining method described in either one of Items 99 to 100 is characterized in that the print-specification information is a width of a long-length photographic paper.

According to the photographic film destination determining method of Item 102, in the photographic processing system in which the print-specification information is a width of a long-length photographic paper, an event in which the destination of the photographic film at which the photographic film is printed to a photographic paper under the requested print-specification in the photographic processing system can not be determined can be avoided, and an automation of the photographic processing system can be enhanced.

Item 103

The photographic film destination determining method described in Item 102 is characterized in that the print-specification information is E (economy) print size or L (large) print size.

According to the photographic film destination determining method of Item 103, in the photographic processing system in which the print-specification information is E (economy) print size or L (large) print size, an event in which the destination of the photographic film at which the photographic film is printed to a photographic paper under the requested print-specification in the photographic processing system can not be determined can be avoided, and an automation of the photographic processing system can be enhanced.

Item 104

The photographic film destination determining method described in Item 101 is characterized in that the surface quality information is information indicating a glossy type, or a silky type.

According to the photographic film destination determining method of Item 104, in the photographic processing system in which the surface quality information is information indicating a glossy type, or a silky type, an event in which the destination of the photographic film at which the photographic film is printed to a photographic paper under the requested print-specification in the photographic processing system can not be determined can be avoided, and an automation of the photographic processing system can be enhanced.

Item 105

The photographic film destination determining method described in Items 99 to 104 is characterized by recording the print-specification information on a photographic film accommodated in the photographic film accommodating container by pasting a sheet on which the print-specification information is written on the photographic film.

According to the photographic film destination determining method of Item 105, the photographic film destination determining information is surely recorded on the photographic film accommodated in the photographic film accommodating container.

Item 106

A photographic film destination determining method is characterized by comprising a memorizing in a correlated condition photographic film identification information and print-specification information which are inputted by an inputting means for inputting the identification information and the print-specification information;

recording the photographic film identification information on the photographic film accommodated in the photographic film accommodating container, reading the print-specification information corresponding to the photographic film identification information from the memory means, based on the photographic film identification information recorded on the photographic film; and wherein a print is obtained in accordance with the print-specification based on the print-specification information read by the reading means.

According to the photographic film destination determining method of Item 106, an event in which the destination of the photographic film at which the photographic film is printed to a photographic paper under the requested print-specification in the photographic processing system can not be determined due to the separation of the print-specification information from the photographic film can be avoided, and an automation of the photographic processing system can be enhanced.

Item 107

The photographic film destination determining method described in Item 106 is characterized by verifying with the memorized photographic film identification information a photographic film identification information recorded on a photographic film accommodating container in which the photographic film is accommodated.

According to the photographic film destination determining method of Item 107, since the photographic processing system comprises the verifying means, an event in which the destination of the photographic film in the photographic processing system can not be determined can be surely avoided, and an automation of the photographic processing system can be enhanced.

Item 108

A photographic film destination determining method at least provided with a plurality of automatic negative film developing apparatus for conducting negative film development, a plurality of automatic photographic paper developing apparatus for conducting photographic paper development, and one or more of packaging apparatus, comprising:

determining the following questions based on processing condition information carried by a negative film to be processed or a negative film cartridge: whether the negative film development is conducted, which of the negative film developing apparatus is used if the negative film development is conducted, whether the photographic paper development is conducted, and which of the photographic paper developing apparatus is used if the photographic paper development is conducted.

According to the photographic film destination determining method of Item 108, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

Item 109

A photographic film destination determining method at least provided with a plurality of automatic negative film developing apparatus for conducting negative film development, a plurality of automatic photographic paper developing apparatus for conducting photographic paper development, and one or more of packaging apparatus, comprising determining the following questions based on processing condition information memorized in correspondence with the film identification information carried by a negative film to be processed or a negative film cartridge: whether the negative film development is conducted, which of the negative film developing apparatus is used if the negative film development is conducted, whether the photographic paper development is conducted, and which of the photographic paper developing apparatus is used if the photographic paper development is conducted.

According to the photographic film destination determining method of Item 109, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

Item 110

A photographic film destination determining method provided with an automatic sorting apparatus, a plurality of automatic negative film developing apparatus for conducting negative film development of one or more, a plurality of automatic photographic paper developing apparatus for conducting photographic paper development, and one or more of packaging apparatus, an automatic conveying passage is provided between the automatic sorting apparatus and the automatic negative film developing apparatus, between the automatic negative film developing apparatus and the automatic photographic paper developing apparatus, and between the automatic photographic paper developing apparatus and the automatic sorting apparatus respectively, each automatic conveying passage automatically conveys the photographic film to the next process based on the destination determining information of the film to be processed.

According to the photographic film destination determining method of Item 110, in the photographic processing system provided with an automatic sorting apparatus, a plurality of automatic negative film developing apparatus for conducting negative film development of one or more, a plurality of automatic photographic paper developing apparatus for conducting photographic paper development, and a single set or more of packaging apparatus, the photographic film can be automatically conveyed by the automatic conveying passage to the next process based on the destination determining information of the film to be processed, thereby attaining automation of processing.

Item 111

In a photographic processing system for processing a photographic film for each order without splicing it to other photographic film, the photographic processing system is characterized in that a destination of each of plural photographic films having a different destination from each other is determined based on photographic film destination determining information corresponding to a photographic film to be processed.

According to the photographic processing system of Item 111, in a photographic processing system for processing a photographic film for each order without splicing it to other photographic film, since a destination of each of plural photographic films having a different destination from each other is determined based on photographic film destination determining information corresponding to a photographic film to be processed, the destination of the photographic film is determined surely and rapidly, and an automation of the photographic processing system can be enhanced.

Item 112

The photographic processing system described in Item 111. is characterized in that the photographic film destination determining information is print-specification information.

According to the photographic processing system of Item 112, the destination of the photographic film is determined surely and rapidly, and an automation of the photographic processing system can be enhanced.

Item 113

The photographic processing system described in Item 111 is characterized in that the photographic film is a long-length photographic film.

According to the photographic processing system of Item 113, in the photographic processing system in which the photographic film is a long-length photographic film, an event in which the destination of the photographic film at which the photographic film is printed to a photographic paper under the requested print-specification in the photographic processing system can not be determined can be avoided, and an automation of the photographic processing system can be enhanced.

Item 114

The photographic processing system described in Item 112 or 113 is characterized in that the photographic processing system comprises a developing apparatus for developing the photographic film, a sorting apparatus for sorting the photographic film for each print-specification and an exposing apparatus for exposing an image of the photographic film to a photographic paper under the print-specification.

According to the photographic processing system of Item 114, in the photographic processing system comprising a developing apparatus for developing the photographic film, a sorting apparatus for sorting the photographic film for each print-specification and an exposing apparatus for exposing an image of the photographic film to a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 115

The photographic processing system described in Item 114 is characterized in that the sorting apparatus for sorting for each print-specification comprises a discriminating means for discriminating the print-specification.

According to the photographic processing system of Item 115, since the sorting apparatus for sorting for each print-specification is provided with the discriminating means for discriminating the print-specification, the print-specification of the photographic film can be surely discriminated and the photographic film can be sorted.

Item 116

The photographic processing system described in Item 114 or 115 is characterized in that a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification.

According to the photographic processing system of Item 116, in the photographic processing system in which a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 117

The photographic processing system described in either one of Items 114 to 116 is characterized in that the developing apparatus is provided for each print-specification.

According to the photographic processing system of Item 117, in the photographic processing system in which the developing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 118

The photographic processing system described in either one of Items 114 to 117 is characterized in that the exposing apparatus is provided for each print-specification.

According to the photographic processing system of Item 118, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 119

The photographic processing system described in Item 114 or 115 is characterized in that a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification.

According to the photographic processing system of Item 119, in the photographic processing system in which a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification, an event in which the destination of the photographic film at which the photographic film is printed to a photographic paper under the requested print-specification in the photographic processing system can not be determined can be avoided, and an automation of the photographic processing system can be enhanced.

Item 120

The photographic processing system described in Items 114, 115, and 119 is characterized in that the exposing apparatus is provided for each print-specification.

According to the photographic processing system of Item 120, in the photographic processing system in which the exposing apparatus is provided for each print-specification, an event in which the destination of the photographic film at which the photographic film is printed to a photographic paper under the requested print-specification in the photographic processing system can not be determined can be avoided, and an automation of the photographic processing system can be enhanced.

Item 121

The photographic processing system described in Item 14 to 23 is characterized by comprising an inputting means for inputting print-specification information of a photographic film based on a sheet on which the print-specification information of the photographic film is recorded;

a memory means for memorizing the inputted print-specification information;

a reading means for reading the print-specification information from the memory means; and a recording means for recording the read print-specification information on the photographic film accommodated in the photographic film accommodating means.

According to the photographic processing system of Item 121, an event in which the destination of the photographic film at which the photographic film is printed to a photographic paper under the requested print-specification in the photographic processing system can not be determined can be avoided, and an automation of the photographic processing system can be enhanced.

Item 122

The photographic processing system described in either one of Items 14 to 23 is characterized by comprising an inputting means for inputting a photographic film identification information and a print-specification information of a photographic film;

a memory means for memorizing the inputted photographic film identification information and the inputted print-specification information;

a verifying means for verifying with the memorized photographic film identification information a photographic film identification information provided on a photographic film accommodating means in which a photographic film identified by the photographic film identification information is accommodated;

a reading means for reading the print-specification information corresponding to the verified photographic film identification information from the memory-means; and a recording means for recording the read print-specification information on the photographic film accommodated in the photographic film accommodating means.

According to the photographic processing system of Item 122, an event in which the destination of the photographic film at which the photographic film is printed to a photographic paper under the requested print-specification in the photographic processing system can not be determined can be avoided, and an automation of the photographic processing system can be enhanced.

Item 123

The photographic processing system described in either one of Items 14, 15, 28 to 32 is characterized by comprising an inputting means for inputting print-specification information of a photographic film, based on a sheet on which the print-specification information of the photographic film is recorded;

a memory means for memorizing the inputted print-specification information;

a reading means for reading the print-specification information from the memory means; and a recording means for recording the read print-specification information on the photographic film accommodated in a photographic film accommodating bag or in photographic film accommodating bag packaged in a photographic film accommodating bag package.

According to the photographic processing system of Item 123, an event in which the destination of the photographic film at which the photographic film is printed to a photographic paper under the requested print-specification in the photographic processing system can not be determined can be avoided, and an automation of the photographic processing system can be enhanced.

Item 124

The photographic processing system described in Item 14, 15, 28 to 32 is characterized by comprising an inputting means for inputting photographic film identification information and print-specification information of a photographic film;

a memory means for memorizing the inputted photographic film identification information and the inputted print-specification;

a verifying means for verifying with the memorized photographic film identification information a photographic film identification information provided on a photographic film accommodating bag or a photographic film accommodating bag package, wherein a photographic film identified by the photographic film identification information is accommodated in the photographic film accommodating bag or in a photographic film accommodating bag packaged in the photographic film accommodating bag package;

a reading means for reading the print-specification information corresponding to the verified photographic film identification information from the memory means; and a recording means for recording the read print-specification information on the photographic film accommodated in the photographic film accommodating bag or in the photographic film accommodating bag packaged in the photographic film accommodating bag package.

According to the photographic processing system of Item 124, an event in which the destination of the photographic film at which the photographic film is printed to a photographic paper under the requested print-specification in the photographic processing system can not be determined can be avoided, and an automation of the photographic processing system can be enhanced.

Item 125

The photographic processing system described in either one of Items 14, 15, and 28 to 32 is characterized by comprising an inputting means for inputting print-specification information, ordered-frame-specifying information and print-number information for the ordered frame, based on a sheet on which the print-specification information of the photographic film is recorded and a photographic film accommodating bag package on which the ordered-frame-specifying information for the photographic film and the print-number information for the ordered frame are recorded or based on a sheet on which the print-specification information of the photographic film is recorded, a photographic film accommodating bag of a photographic film, and a photographic film accommodating bag package on which the ordered-frame-specifying information for the photographic film and the print-number information for the ordered frame are recorded;

a memory means for memorizing the inputted print-specification information, the inputted ordered-frame-specifying information and the inputted print number information for the ordered frame;

a reading means for reading the print-specification information, the ordered-frame-specifying information and the print-number information for the ordered frame from the memory means from the memory means; and a recording means for recording the read print-specification information, the ordered-frame-specifying information and the print-number information for the ordered frame on the photographic film accommodated in the photographic film accommodating bag.

According to the photographic processing system of Item 125, an event in which the destination of the photographic film at which the photographic film is printed to a photographic paper under the requested print-specification in the photographic processing system can not be determined can be avoided, and an automation of the photographic processing system can be enhanced.

Item 126

The photographic processing system described in either one of Items 14, 15, and 28 to 32 is characterized by comprising an inputting means for inputting photographic film identification information, print-specification information of a photographic film, ordered-frame-specifying information for the photographic film and print-number information for the ordered frame;

a memory means for memorizing the inputted photographic film identification information, the inputted print-specification information, the inputted ordered-frame-specifying information and the inputted print number information for the ordered frame;

a verifying means for verifying with the memorized photographic film identification information a photographic film identification information recorded on a photographic film accommodating bag or a photographic film accommodating bag package;

a reading means for reading the print-specification information, the ordered-frame-specifying information for the photographic film and the print-number information for the ordered frame corresponding to the verified photographic film identification information from the memory means; and a recording means for recording the read print-specification information, the read ordered-frame-specifying information and the read print-number information for the ordered frame on the photographic film accommodated in the photographic film accommodating bag.

According to the photographic processing system of Item 126, an event in which the destination of the photographic film at which the photographic film is printed to a photographic paper under the requested print-specification in the photographic processing system can not be determined can be avoided, and an automation of the photographic processing system can be enhanced.

Item 127

The photographic processing system described in either one of Items 14, 15, and 28 to 32 is characterized by comprising an inputting means for inputting print-specification information, ordered-frame-specifying information and print-number information for the ordered frame, based on a sheet on which the print-specification information of the photographic film, the ordered-frame-specifying information for the photographic film and the print-number information for the ordered frame are recorded;

a memory means for memorizing the inputted print-specification information, the inputted ordered-frame-specifying information for the photographic film and the inputted print number information for the ordered frame;

a reading means for reading the print-specification information, the ordered-frame-specifying information for the photographic film and the print-number information for the ordered frame from the memory means; and a recording means for recording the read print-specification information, the read ordered-frame-specifying information for the photographic film and the read print-number information for the ordered frame on the photographic film accommodated in the photographic film accommodating bag.

According to the photographic processing system of Item 127, an event in which the destination of the photographic film at which the photographic film is printed to a photographic paper under the requested print-specification in the photographic processing system can not be determined can be avoided, and an automation of the photographic processing system can be enhanced.

Item 128

The photographic processing system described in either one of Items 14, 15, and 28 to 32 is characterized by comprising an inputting means for inputting photographic film identification information, print-specification information, ordered-frame-specifying information for the photographic film and print-number information for the ordered frame;

a memory means for memorizing the inputted photographic film identification information, the inputted print-specification information, the inputted ordered-frame-specifying information for the photographic film and the inputted print number information for the ordered frame in a correlated condition between them;

a verifying means for verifying with the memorized photographic film identification information a photographic film identification information recorded on a photographic film accommodating bag of a photographic film or a photographic film accommodating bag package of a photographic film;

a reading means for reading the print-specification information, the ordered-frame-specifying information for the photographic film and the print-number information for the ordered frame corresponding to the verified photographic film identification information from the memory means; and a recording means for recording the read print-specification information, the read ordered-frame-specifying information for the photographic film and the read print-number information for the ordered frame on the photographic film accommodated in the photographic film accommodating bag.

According to the photographic processing system of Item 128, an event in which the destination of the photographic film at which the photographic film is printed to a photographic paper under the requested print-specification in the photographic processing system can not be determined can be avoided, and an automation of the photographic processing system can be enhanced.

Item 129

The photographic processing system described in either one of Items 111 to 120 is characterized by comprising an inputting means for inputting photographic film identification information for identifying the photographic film and print-specification information of the photographic film, based on a sheet on which the print-specification information of the photographic film is recorded;

a memory means for memorizing the inputted photographic film identification information and the inputted print-specification information in a correlated condition between them;

a verifying means for verifying with the memorized photographic film identification information a photographic film identification information recorded on a photographic film accommodating container for accommodating a photographic film and/or a photographic film accommodated in a photographic film accommodating means;

a reading means for reading the print-specification information corresponding to the verified photographic film identification information from the memory means; and means for transmitting the read print-specification information.

According to the photographic processing system of Item 129, an event in which the destination of the photographic film at which the photographic film is printed to a photographic paper under the requested print-specification in the photographic processing system can not be determined can be avoided, and an automation of the photographic processing system can be enhanced.

Item 130

The photographic processing system described in either one of Items 111 to 120 is characterized by comprising an inputting means for inputting photographic film identification information and print-specification information of the photographic film, based on a sheet on which the photographic film identification information and the print-specification information of the photographic film are recorded;

a memory means for memorizing the inputted photographic film identification information and the inputted print-specification information in a correlated condition between them;

a verifying means for verifying with the memorized photographic film identification information a photographic film identification information recorded on a photographic film accommodating container for accommodating a photographic film and/or a photographic film accommodated in a photographic film accommodating means;

a reading means for reading the print-specification information corresponding to the verified photographic film identification information from the memory means; and means for transmitting the read print-specification information.

According to the photographic processing system of Item 130, an event in which the destination of the photographic film at which the photographic film is printed to a photographic paper under the requested print-specification in the photographic processing system can not be determined can be avoided, and an automation of the photographic processing system can be enhanced.

Item 131

The photographic processing system described in either one of Items 111 to 120 is characterized by comprising an inputting means for inputting photographic film identification information and print-specification information of the photographic film;

a memory means for memorizing the inputted photographic film identification information and the inputted print-specification information in a correlated condition between them;

a verifying means for verifying with the memorized photographic film identification information a photographic film identification information recorded on a photographic film accommodating container for accommodating a photographic film and/or a photographic film accommodated in a photographic film accommodating means;

a reading means for reading the print-specification information corresponding to the verified photographic film identification information from the memory means; and means for transmitting the read print-specification information.

According to the photographic processing system of Item 131, an event in which the destination of the photographic film at which the photographic film is printed to a photographic paper under the requested print-specification in the photographic processing system can not be determined can be avoided, and an automation of the photographic processing system can be enhanced.

Item 132

In a photographic processing system in which a photographic paper is exposed based on a developed photographic film, subject to a development process and conveyed through a conveying passage, the photographic processing system is characterized in that a destination of each of plural photographic paper having a different destination from each other is determined based on photographic paper destination determining information recorded on a photographic paper and the conveying passage is selected.

According to the photographic processing system of Item 132, a destination of each of plural photographic paper having a different destination from each other is surely determined based on photographic paper destination determining information recorded on a photographic paper, and an automation of the photographic processing system can be enhanced.

Item 133

The photographic processing system described in Item 132 is characterized in that the photographic paper destination determining information is information capable of corresponding to the developed photographic film used as the basis of the exposure.

According to the photographic processing system of Item 133, a destination of the photographic paper in the photographic processing system can be surely determined based on the photographic paper destination determining information which is recorded on the photographic paper in correspondence with the developed photographic film, and an automation of the photographic processing system can be enhanced.

Item 134

The photographic processing system described in either one of Items 132 to 133 is characterized in that the photographic paper destination determining information is identification information of the developed photographic film used as the basis of the exposure.

According to the photographic processing system of Item 134, a destination of the photographic paper in the photographic processing system can be surely determined by using the identification information of the photographic film as the photographic paper destination determining information, and an automation of the photographic processing system can be enhanced.

Item 135

In a method of determining a destination of each of plural photographic films having a different destination from each other in a photographic processing system for processing a photographic film for each order without splicing it to other photographic film, the photographic film destination determining method is characterized in that a destination of each of plural photographic films having a different destination from each other is determined based on photographic film destination determining information corresponding to a photographic film to be processed.

According to the photographic film destination determining method of Item 135, since a destination of each of plural photographic films having a different destination from each other is determined based on photographic film destination determining information corresponding to a photographic film to be processed, the destination of the photographic film is determined surely and rapidly, and an automation of the photographic processing system can be enhanced.

Item 136

The photographic film destination determining method described in Item 135 is characterized in that the photographic film destination determining information is print-specification information.

According to the photographic film destination determining method of Item 136, the destination of the photographic film is determined surely and rapidly, and an automation of the photographic processing system can be enhanced.

Item 137

The photographic film destination determining method described in Item 135 is characterized in that the photographic film is a long-length photographic film.

According to the photographic film destination determining method of Item 137, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 138

The photographic film destination determining method described in Item 136 to 137 is characterized in that the photographic processing system comprises a developing apparatus for developing the photographic film, a sorting apparatus for sorting the photographic film for each print-specification and an exposing apparatus for exposing an image of the photographic film to a photographic paper under the print-specification.

According to the photographic film destination determining method of Item 138, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 139

The photographic film destination determining method described in Item 138 is characterized in that the sorting apparatus for sorting for each print-specification comprises a discriminating means for discriminating the print-specification.

According to the photographic film destination determining method of Item 139, since the sorting apparatus for sorting for each print-specification is provided with the discriminating means for discriminating the print-specification, the print-specification of the photographic film can be surely discriminated and the photographic film can be sorted.

Item 140

The photographic film destination determining method described in Item 138 or 139 is characterized in that a photographic film is sorted for each print-specification by the sorting apparatus, the photographic film sorted for each print-specification is developed by the developing apparatus, and an image of the photographic film which is sorted for each print-specification and developed is exposed by the exposing apparatus capable of exposing the image onto a photographic paper under the print-specification.

According to the photographic film destination determining method of Item 140, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 141

The photographic film destination determining method described in either one of Items 138 to 140 is characterized in that the developing apparatus is provided for each print-specification.

According to the photographic film destination determining method of Item 141, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 142

The photographic film destination determining method described in either one of Items 138 to 141 is characterized in that the exposing apparatus is provided for each print-specification.

According to the photographic film destination determining method of Item 142, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 143

The photographic film destination determining method described in Item 138 or 139 is characterized in that a photographic film is developed by the developing apparatus, the developed photographic film is sorted for each print-specification by the sorting apparatus, and an image of the photographic film which is developed and sorted for each print-specification is exposed by the exposing apparatus capable of exposing the image onto a photographic paper under the print-specification.

According to the photographic film destination determining method of Item 143, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 144

The photographic film destination determining method described in Item 138, 139, or 143 is characterized in that the exposing apparatus is provided for each print-specification.

According to the photographic film destination determining method of Item 144, in the photographic film destination determining method, an event in which the destination of the photographic film at which the photographic film is printed to a photographic paper under the requested print-specification in the photographic processing system can not be determined can be avoided, and an automation of the photographic processing system can be enhanced.

Item 145

The photographic film destination determining method described in either one of Items 69 to 78 is characterized by comprising

- inputting print-specification information of a photographic film, based on a sheet on which the print-specification information of the photographic film is recorded;
- memorizing the inputted print-specification information in a memory means;
- reading the print-specification information from the memory means; and
- recording the read print-specification information on the photographic film accommodated in the photographic film accommodating means.

According to the photographic film destination determining method of Item 145, an event in which the destination of the photographic film at which the photographic film is printed to a photographic paper under the requested print-specification in the photographic processing system can not be determined can be avoided, and an automation of the photographic processing system can be enhanced.

Item 146

The photographic film destination determining method described in either one of Items 69 to 78 is characterized by comprising

- inputting photographic film identification information and print-specification information of a photographic film;
- memorizing the inputted photographic film identification information and the inputted print-specification information in a memory means;
- verifying with the memorized photographic film identification information a photographic film identification information provided on a photographic film accommodating means in which the photographic film identified by the photographic film identification information is accommodated;
- reading the print-specification information corresponding to the verified photographic film identification information from the memory means; and
- recording the read print-specification information on the photographic film accommodated in the photographic film accommodating means.

According to the photographic film destination determining method of Item 146, an event in which the destination of the photographic film at which the photographic film is printed to a photographic paper under the requested print-specification in the photographic processing system can not be determined can be avoided, and an automation of the photographic processing system can be enhanced.

Item 147

The photographic film destination determining method described in either one of Items 69, 70, 83 to 87 is characterized by comprising

- inputting print-specification information of a photographic film, based on a sheet on which the print-specification information of the photographic film is recorded;
- memorizing the inputted print-specification information in a memory means;
- reading the print-specification information from the memory means; and
- recording the read print-specification information on the photographic film accommodated in a photographic film accommodating bag or in a photographic film accommodating bag packaged in a photographic film accommodating bag package.

According to the photographic film destination determining method of Item 147, an event in which the destination of the photographic film at which the photographic film is printed to a photographic paper under the requested print-specification in the photographic processing system can not be determined can be avoided, and an automation of the photographic processing system can be enhanced.

Item 148

The photographic film destination determining method described in either one of Items 69, 70, 83 to 87 is characterized by comprising

- inputting photographic film identification information and print-specification information of a photographic film;
- memorizing the inputted photographic film identification information and the inputted print-specification in a memory means;
- verifying with the memorized photographic film identification information a photographic film identification information provided on a photographic film accommodating bag or a photographic film accommodating bag package, wherein a photographic film identified by the photographic film identification information is accommodated in the photographic film accommodating bag or in a photographic film accommodating bag packaged in the photographic film accommodating bag package;
- reading the print-specification information corresponding to the verified photographic film identification information from the memory means; and recording the read print-specification information on the photographic film accommodated in the photographic film accommodating bag or in the photographic film accommodating bag packaged the photographic film accommodating bag package.

According to the photographic film destination determining method of Item 148, an event in which the destination of the photographic film at which the photographic film is printed to a photographic paper under the requested print-specification in the photographic processing system can not be determined can be avoided, and an automation of the photographic processing system can be enhanced.

Item 149

The photographic film destination determining method described in either one of Items 69, 70, and 83 to 87 is characterized by comprising inputting print-specification information, ordered-frame-specifying information and print-number information for the ordered frame, based on a sheet on which the print-specification information of the photographic film is recorded and a photographic film accommodating bag package on which the ordered-frame-specifying information for the photographic film and the print-number information for the ordered frame are recorded or based on a sheet on which the print-specification information of the photographic film is recorded, a photographic film accommodating bag of a photographic film, and a photographic film accommodating bag package on which ordered-frame-specifying information for the photographic film and the print-number information for the ordered frame are recorded;

memorizing the inputted print-specification information, the inputted ordered-frame-specifying information and the inputted print number information for the ordered frame in a memory means;

reading the print-specification information, the ordered-frame-specifying information and the print-number information for the ordered frame from the memory means; and recording the read print-specification information, the ordered-frame-specifying information and the print-number information for the ordered frame on the photographic film accommodated in the photographic film accommodating bag.

According to the photographic film destination determining method of Item 149, an event in which the destination of the photographic film at which the photographic film is printed to a photographic paper under the requested print-specification in the photographic processing system can not be determined can be avoided, and an automation of the photographic processing system can be enhanced.

Item 150

The photographic film destination determining method described in either one of Items 69, 70, and 83 to 87 is characterized by comprising inputting photographic film identification information, print-specification information of a photographic film, ordered-frame-specifying information for the photographic film and print-number information for the ordered frame;

memorizing the inputted photographic film identification information, the inputted print-specification information, the inputted ordered-frame-specifying information and the inputted print number information for the ordered frame by a memory means;

verifying with the photographic film identification information memorized in the memory means a photographic film identification information recorded on a photographic film accommodating bag or a photographic film accommodating bag package;

reading the print-specification information, the ordered-frame-specifying information for the photographic film and the print-number information for the ordered frame corresponding to the verified photographic film identification information from the memory means; and recording the read print-specification information, the read ordered-frame-specifying information and the read print-number information for the ordered frame on the photographic film accommodated in the photographic film accommodating bag.

According to the photographic film destination determining method of Item 150, an event in which the destination of the photographic film at which the photographic film is printed to a photographic paper under the requested print-specification in the photographic processing system can not be determined can be avoided, and an automation of the photographic processing system can be enhanced.

Item 151

The photographic film destination determining method described in either one of Items 69, 70, and 83 to 87 is characterized by comprising inputting print-specification information, ordered-frame-specifying information and print-number information for the ordered frame, based on a sheet on which the print-specification information of the photographic film, the ordered-frame-specifying information for the photographic film and print-number information for the ordered frame are recorded;

memorizing the inputted print-specification information, the inputted ordered-frame-specifying information for the photographic film and the inputted print number information for the ordered frame in a memory means;

reading the print-specification information, the ordered-frame-specifying information for the photographic film and the print-number information for the ordered frame from the memory means; and recording the read print-specification information, the read ordered-frame-specifying information for the photographic film and the read print-number information for the ordered frame on the photographic film accommodated in the photographic film accommodating bag.

According to the photographic film destination determining method of Item 151, an event in which the destination of the photographic film at which the photographic film is printed to a photographic paper under the requested print-specification in the photographic processing system can not be determined can be avoided, and an automation of the photographic processing system can be enhanced.

Item 152

The photographic film destination determining method described in either one of Items 69, 70, and 83 to 87 is characterized by comprising inputting photographic film identification information, print-specification information, ordered-frame-specifying information for the photographic film and print-number information for the ordered frame;

memorizing the inputted photographic film identification information, the inputted print-specification information, the inputted ordered-frame-specifying information for the photographic film and the inputted print number information for the ordered frame in a correlated condition between them in a memory means;

verifying with the memorized photographic film identification information a photographic film identification information recorded on a photographic film accommodating bag of a photographic film or on a photographic film accommodating bag package of a photographic film;

reading the print-specification information, the ordered-frame-specifying information for the photographic film and the print-number information for the ordered frame corresponding to the verified photographic film identification information from the memory means; and recording the read print-specification information, the read ordered-frame-specifying information for the photographic film and the read print-number information for the ordered frame on the photographic film accommodated in the photographic film accommodating bag.

According to the photographic film destination determining method of Item 152, an event in which the destination of the photographic film at which the photographic film is printed to a photographic paper under the requested print-specification in the photographic processing system can not be determined can be avoided, and an automation of the photographic processing system can be enhanced.

Item 153

The photographic film destination determining method described in either one of Items 135 to 144 is characterized by comprising inputting photographic film identification information for identifying the photographic film and print-specification information of the photographic film, based on a sheet on which the print-specification information of the photographic film is recorded;

memorizing the inputted photographic film identification information and the inputted print-specification information in a correlated condition between them in a memory means;

verifying with the photographic film identification information memorized in the memory a photographic film identification information recorded on a photographic film accommodating container for accommodating a photographic film and/or a photographic film accommodated in a photographic film accommodating means;

reading the print-specification information corresponding to the verified photographic film identification information from the memory means; and transmitting the read print-specification information.

According to the photographic film destination determining method of Item 153, an event in which the destination of the photographic film at which the photographic film is printed to a photographic paper under the requested print-specification in the photographic processing system can not be determined can be avoided, and an automation of the photographic processing system can be enhanced.

Item 154

The photographic film destination determining method described in either one of Items 135 to 144 is characterized by comprising inputting photographic film identification information and print-specification information of the photographic film, based on a sheet on which the photographic film identification information and the print-specification information of the photographic film are recorded;

memorizing the inputted photographic film identification information and the inputted print-specification information in a correlated condition between them in a memory means;

verifying with the photographic film identification information memorized in the memory means a photographic film identification information recorded on a photographic film accommodating container for accommodating a photographic film and/or on a photographic film accommodated in a photographic film accommodating means;

reading the print-specification information corresponding to the verified photographic film identification information from the memory means; and transmitting the read print-specification information.

According to the photographic film destination determining method of Item 154, an event in which the destination of the photographic film at which the photographic film is printed to a photographic paper under the requested print-specification in the photographic processing system can not be determined can be avoided, and an automation of the photographic processing system can be enhanced.

Item 155

The photographic film destination determining method described in either one of Items 135 to 144 is characterized by comprising inputting photographic film identification information and print-specification information of the photographic film;

memorizing the inputted photographic film identification information and the inputted print-specification information in a correlated condition between them in a memory means;

verifying with the photographic film identification information memorized in the memory means a photographic film identification information recorded on a photographic film accommodating container for accommodating a photographic film and/or on a photographic film accommodated in a photographic film accommodating means;

reading the print-specification information corresponding to the verified photographic film identification information from the memory means; and means for transmitting the read print-specification information.

According to the photographic film destination determining method of Item 155, an event in which the destination of the photographic film at which the photographic film is printed to a photographic paper under the requested print-specification in the photographic processing system can not be determined can be avoided, and an automation of the photographic processing system can be enhanced.

Item 156

In a photographic film destination determining method of determining a destination of each of plural photographic films having a different destination from each other in a photographic processing system in which a photographic paper is exposed based on a developed photographic film, subject to a development process and conveyed through a conveying passage, the photographic film destination determining method is characterized in that a destination of each of plural photographic paper having a different destination from each other is determined based on photographic paper destination determining information recorded on a photographic paper and the conveying passage is selected.

According to the photographic film destination determining method of Item 156, a destination of each of plural photographic paper having a different destination from each other is surely determined based on photographic paper destination determining information recorded on a photographic paper, and an automation of the photographic processing system can be enhanced.

Item 157

The photographic film destination determining method described in Item 156 is characterized in that the photographic paper destination determining information is information capable of corresponding to the developed photographic film used as the basis of the exposure.

According to the photographic film destination determining method of Item 157, a destination of the photographic paper in the photographic processing system can be surely determined based on the photographic paper destination determining information which is recorded on the photographic paper in correspondence with the developed photographic film, and an automation of the photographic processing system can be enhanced.

Item 158

The photographic film destination determining method described in either one of Items 156 or 157 is characterized in that the photographic paper destination determining information is identification information of the developed photographic film used as the basis of the exposure.

According to the photographic processing system of Item 158, a destination of the photographic paper in the photographic processing system can be surely determined by using the identification information of the photographic film as the photographic paper destination determining information, and an automation of the photographic processing system can be enhanced.

BRIEF EXPLANATION OF DRAWINGS

FIG. 5 is a table showing destination where photographed and undeveloped films and developed photographic film go in a large-scale photo-finishing laboratory.

Best Embodiment for Implementating the Invention

Hereinafter, an example of the embodiment of the present invention will be explained. However, the embodiment of the present invention is not limited thereto.

First, a step until a photographic film in which a customer requests processing, i.e., photographed and undeveloped photographic film or a developed photographic film is handed over to a large-scale photo-finishing laboratory will be explained.

First, an operation conducted in a retail shop when a customer requests processing, i.e., photographed and undeveloped photographic film or a developed photographic film will be explained.

Figure 2:
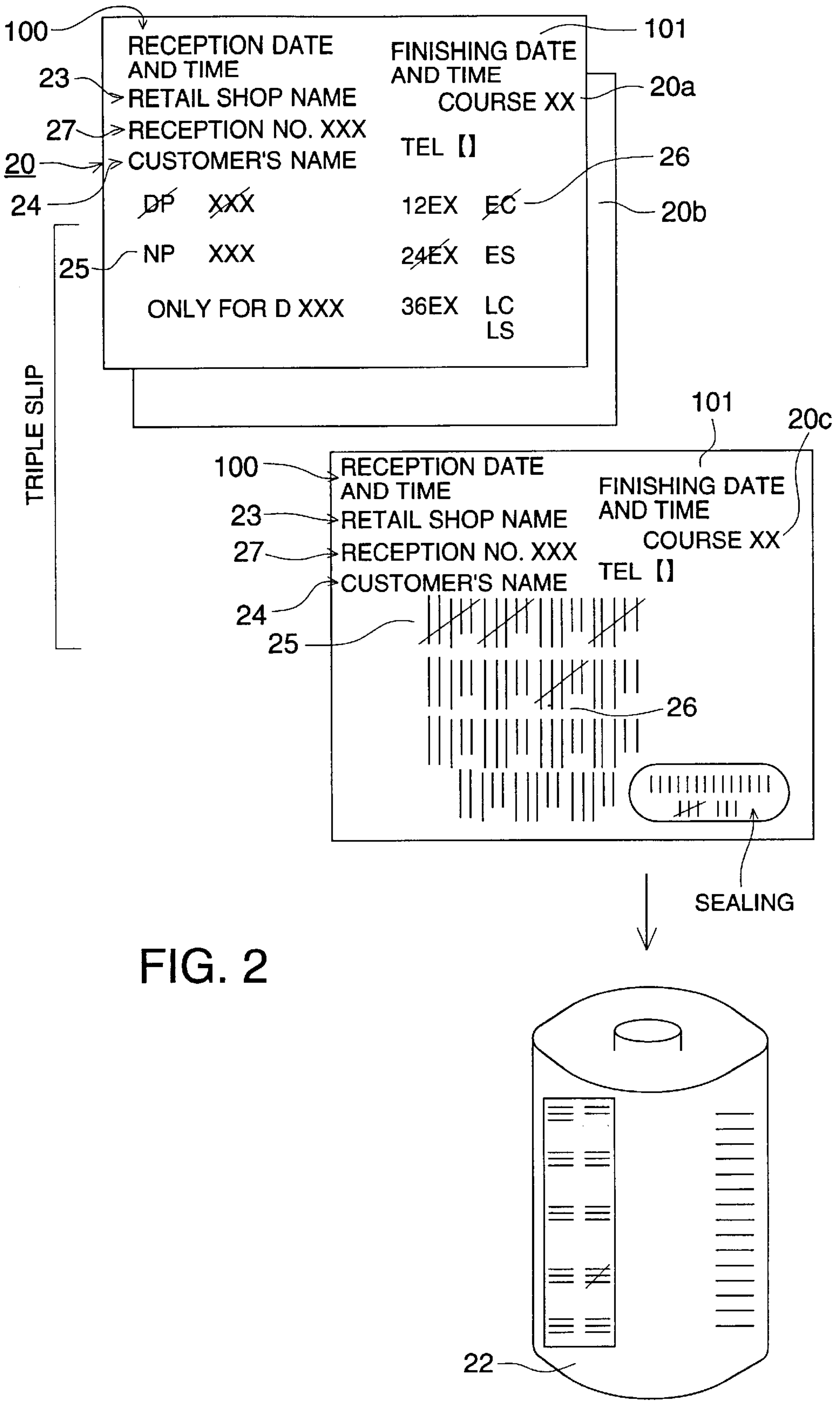
FIG. 2 is a drawing explaining the status in which information is recorded on an order reception slip at a retail photo shop.

At the retail shop, information is recorded on an order-reception slip as shown in FIG. 2 by the customer or by a clerk of aforesaid retail shop. Here, "an order reception slip" will be explained. Order reception slip 20 is composed of triple layers, i.e., exchange slip 20*a* for the customer, order slip 20*b* for the retail shop and a bar code slip 20*c* for data-input in a large-scale photo-finishing laboratory. In addition, since a pressure sensitive recording method has been adopted, if the customer or the clerk of the retail shop records information on exchange slip 20*a* which is located at the most upper page by means of a ball point pen etc, aforesaid information is recorded on three sheets simultaneously. Due to this system, the customer, the retail shop and the large scale photo-finishing laboratory can share the same information. Incidentally, information recorded on order reception slip 20 includes information 23 which identifies the name of the retail shop by which the photographic film is received (hereinafter, referred to as retail shop identifying information. "In processes in a large scale photo-finishing laboratory described later, aforesaid information may function as returned-retail shop identifying information or return destination specifying information by which the retail shop to which the processed product is returned is identified".), information 24 which identifies the name of the customer who requested processing of the photographic film (practically, composed of the name, I.D. number or signature of the customer. Hereinafter, referred to as a customer identifying information. In processes in a large scale photo-finishing laboratory described later, aforesaid information may function as a customer identifying information by which the customer and the product to which the processed product is returned is identified), reception number 27 (in the embodiment of the present invention, a serial number which is available in plural retail shops having a business connection with the large scale photo-finishing laboratory. However, a serial number which is used only in each retail shop may also be used. In the processes in the large scale photo-finishing laboratory, it functions as photographic film identifying information for identifying the photographic film), information 25, whether this order is a developing-and-printing order, printing from a negative film or a developing only order, print specification information 26 (in the processes in the large scale photo-finishing laboratory described later, aforesaid information 25 and 26 function as where-to-go determination (destination) information which determines where the photographic film is routed), reception date and time 100 and finishing date and time 101 (in the embodiment of the present invention, aforesaid information 100 and 101 have no specified function. However, in the processes in the large scale photo-finishing laboratory described later, aforesaid information may function as destination information which determines where the film goes to). Further, the following two items of information may be included: namely ordering frame specifying information which is recorded when print processing of an image of developed photographic film is only requested and information about number of printing the requested frame (explanation will be added to these two types of information).

On bar code slip 20*c* for data-input in the large scale photo-finishing laboratory, one sheet or plural sheets stacked and secured as a peelable recording medium wherein a reception number is printed in the form of a bar code by means of a bar code imprinting machine (not illustrated). It is preferable that the reception number is set in bar code form designated by the large scale photo-finishing laboratory. Due to this, photographic film can easily be controlled in a large scale photo-finishing laboratory which receives orders and requests by plural customers.

EC, ESC, LC and LSC in print specification information 26 are combination of E and L (which are ordinarily referred to as print sizes) which indicate the width of a long roll of photographic paper loaded on an exposure device and C (glossy) and SC (silk) which indicate the surface type of a long roll of photographic paper loaded on the exposure device.

When a customer places an order of processing photographed and undeveloped photographic film at a retail shop, a clerk usually records information on exchange slip 20*a* which is located on the top sheet of order reception slip 20 by the use of a ball point pen etc. Then, as described above, three slips (which may be simply refered to as "a shee") are simultaneously recorded. One sheet of plural peelable seals wherein the reception number affixed on bar code slip 20*c* for inputted by a large scale photo-finishing laboratory is caused to be bar coded and printed is peeled off. Following this, one of three sheets is sealed on a housing container or an accommodating container (made of metal or resin) which houses the customer's photographed and undeveloped photographic film. Among three slips on which data was recorded, exchange slip 20*a* for the customer is handed over to the customer. Order slip 20*b* for the retail shop is stored by the retail shop. Bar code slip 20*c* for data-input by the large scale photo-finishing laboratory wherein one of plural of the above-mentioned peelable seals has been peeled and data has been recorded and a housing container in which the customer's photographed and undeveloped photographic film on which one of peelable seal has been affixed are handed over to the large scale photo-finishing laboratory.

Figure 3:
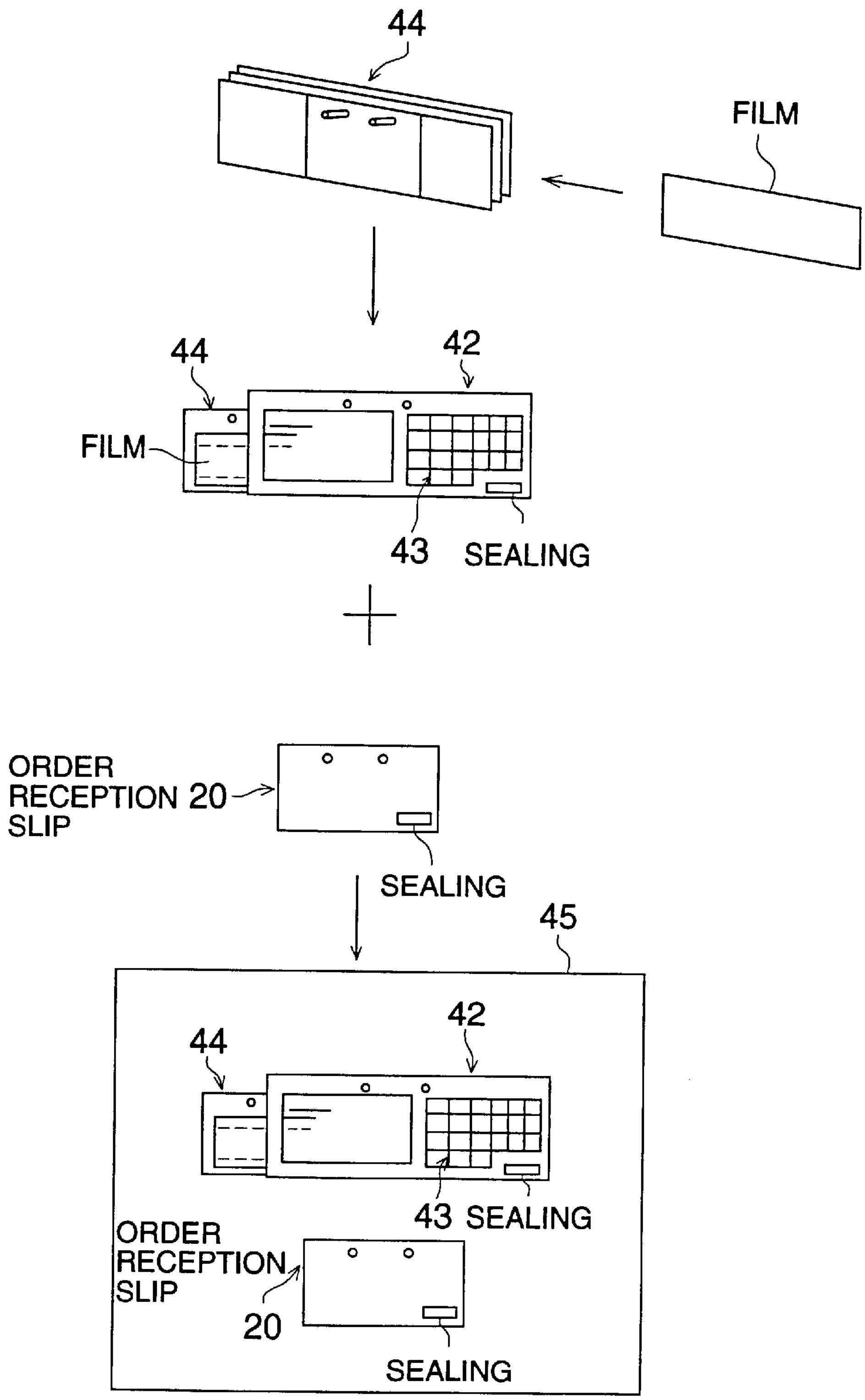
FIG. 3 is a drawing explaining status in which a developed short-length photographic film is housed in a photographic film housing envelope.

When a customer requests the retail shop only prints of the developed photographic film, a short-length developed photographic film having a prescribed number of frame which have been cut from a long-roll photographic film is housed in photographic film housing envelope 44 as shown in FIG. 3. The embodiment of the present invention discloses only a case when a customer requests the retail shop to print from a developed short-length photographic film. However, there may be cases when a customer requests the retail shop to print from a developed long-length roll photographic film. In such occasions, a photographic film housing envelope or a photographic film accommodating bag in which a long-length roll photographic film can be housed is used. When the retail shop to which processing of the photographic film this time is the same as the previous case, the photographic film housing envelope which houses a developed short-length photographic film is handed over to the retail shop in a state in which the photographic film housing envelope is packaged in a photographic film housing packaging material or a photographic film accommodating bag package 42 as shown in FIG. 3. If the photographic film housing envelope which houses the developed and short-length photographic film is different from that used in the retail shop from which the customer requested printing this time, the retail shop this time repackaging to photographic film housing envelope packaging material 42.

On photographic film housing envelope packaging material 42, order slip 43 is provided. Order slip 43 is so arranged that it can record at least information (hereinafter referred to as "order frame identifying information") which identifies the image frame which the customer requests printing and information (hereinafter referred to as order frame printing number information) about how many must be printed from the image frame which the customer requests. However, if order reception slip 20 can record order frame identifying information and order frame printing number information, the order slip may not be provided on photographic film housing envelope packaging material 42.

Order frame identifying information and order frame printing number information are recorded on order slip 43 on photographic film housing envelope packaging material 42, recording is conducted on order reception slip 20 in the same manner as in that which the customer requests at the retail shop to process photographed and undeveloped photographic film (however, if order frame identifying information and order frame printing number information are recorded on order reception slip 20, order frame identifying information is recorded there.), one of one or plural peelable seals in which the reception number is entered in bar code and printed on bar code slip 20*c* for data-input in the large scale photo-finishing laboratory is peeled off and aforesaid one sheet is sealed on photographic film housing envelope 44 or photographic film housing envelope packaging material 42. Among three sheets of order reception slips 20, exchange slip 20*a* for the customer is handed over to the customer. Order slip 20*b* for the retail shop is stored in the retail shop. Bar code slip 20*c* for data-input in the large scale photo-finishing laboratory in which one of one or plural of the above-mentioned peelable seals and photographic film housing envelope packaging material 42 which packages photographic film housing envelope 44 which houses a developed and short-length photographic film are handed over to the large scale photo-finishing laboratory. It is a repeat though, one sheet among the above-mentioned peelable seal is affixed on photographic film housing envelope 44 or photographic film housing envelope packaging material 42.

So far is an explanation about operation conducted in a retail shop, when a customer requests said retail shop to process a photographed and undeveloped photographic film or a developed photographic film.

Next, a brief explanation will be made when a customer requests directly a large scale photo-finishing laboratory to process a photographed and undeveloped photographic film or a developed photographic film not through a retail shop.

Operation conducted by a customer when the customer requests directly a large scale photo-finishing laboratory to process a photographed and undeveloped photographic film or a developed photographic film not through a retail shop (for example, when a non-operator order receiving device or facility for photographic processing is utilized. In this occasion, returning of the light-sensitive material to the customer is conducted through aforesaid device or facility or by postal mail delivery not through aforesaid device or facility) is an operation when a customer requests the retail shop to process a photographed and undeveloped photographic film or a developed photographic film except that recording of the retail shop identifying information on order reception slip 20 and storage of retail shop order slip 20*b* for the retail shop by the retail shop are omitted (however, returning of the light-sensitive material, which was processed by a non-operator order receiving device or facility, to the customer is conducted through aforesaid device or facility, information about the device or facility will be recorded on order reception slip 20.). It is superfluous though, it is preferable that a reception number is printed on order reception slip 20 by the large scale photo-finishing laboratory and that information that the customer requested the large scale photo-finishing laboratory directly, not through a retail shop, to process a photographed undeveloped photographic film or a developed photographic film is recorded. It is not necessary that a retail shop identifying information is not contained in information printed as a bar code on one or plural peelable seal affixed on bar code slip 20*c* for data-input in the large scale photo-finishing laboratory (however, returning of the light-sensitive material, which was processed by a non-operator order receiving device or facility, to the customer is conducted through aforesaid device or facility, information about the device or facility will be contained in place thereof.).

So far, a system in which one or plural peelable seals are affixed on bar code slip 20*c* for data-input in the large scale photo-finishing laboratory was explained. However, it is not necessary that the above-mentioned peelable seal is not affixed on bar code slip 20*c* for data-input in the large scale photo-finishing laboratory. In the latter case, bar code slip 20*c* wherein data has been recorded and a housing container which contains the customer's photographed and undeveloped photographic film, or bar code slip 20*c* wherein data has been recorded and photographic film housing packaging material 42 which packages photographic film housing envelope 44 which houses a developed short-length photographic film are handed over to the large scale photo-finishing laboratory in a certain manner; namely a set of one bar code slip 20*c* for data-input in the large scale photo-finishing laboratory and one housing container which contains the customer's photographed and undeveloped photographic film, or a set of one bar code slip 20*c* for data-input in the large scale photo-finishing laboratory and one photographic film housing packaging material 42 is respectively packaged in an envelope to be handed over to the large scale photo-finishing laboratory. In the large scale photo-finishing laboratory, seals on which a number identical to a reception number recorded on bar code slip 20*c* for data-input in the large scale photo-finishing laboratory are affixed on a housing container which contains the customer's photographed and undeveloped photographic film or photographic film housing envelope 44 and photographic film housing packaging material 42.

So far, a process until bar code slip 20*c* for data-input in the large scale photo-finishing laboratory wherein recording has been put on is handed over to the large scale photo-finishing laboratory was explained. However, information recorded on bar code slip 20*c* for data-input in the large scale photo-finishing laboratory may be read, stored in an electronic recording medium and sent to the large scale photo-finishing laboratory, or aforesaid information may be stored in a portable electronic recording medium (for example, a floppy disk) to be handed over to the large scale photo-finishing laboratory. However, in such occasions, in order to clarify which information recorded on bar code slip 20*c* for data-input in the large scale photo-finishing laboratory is recorded in which housing container which contains the customer's photographed and undeveloped photographic film or photographic film housing envelope 44 and photographic film housing packaging material 42, the above-mentioned seals are affixed on a photographed and undeveloped photographic film, photographic film housing envelope 44 and photographic film housing packaging material 42 so that the information recorded on bar code slip 20*c* for data-input in the large scale photo-finishing laboratory stored in the electronic storing medium is corresponded.

So far is a process until a photographed and undeveloped photographic film or a developed photographic film which a customer requested to process are handed over to a large scale photo-finishing laboratory.

Figure 1:
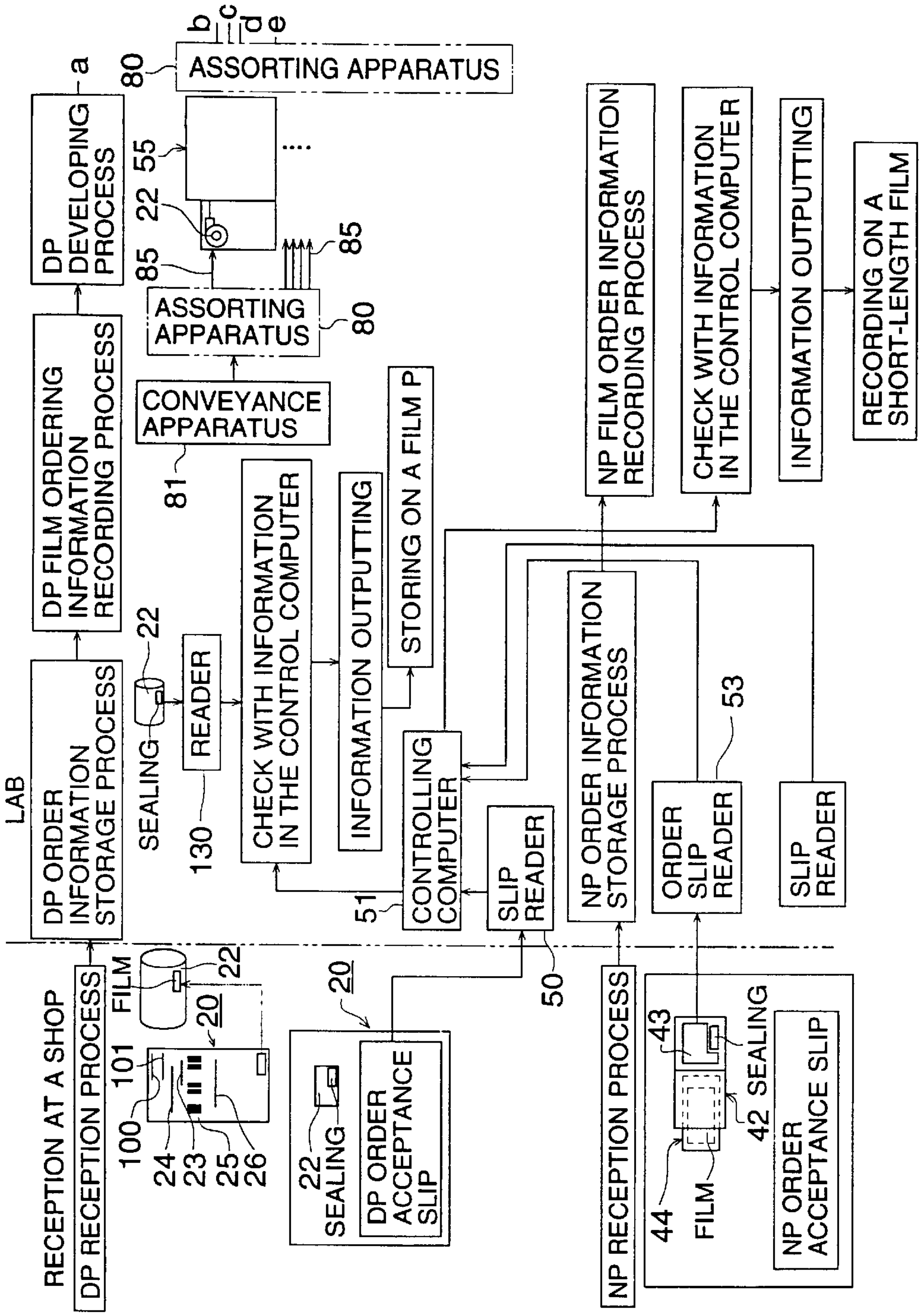
FIGS. 1(*a*) and 1(*b*) are schematic block diagrams of the photographic processing system.
Figure 1:
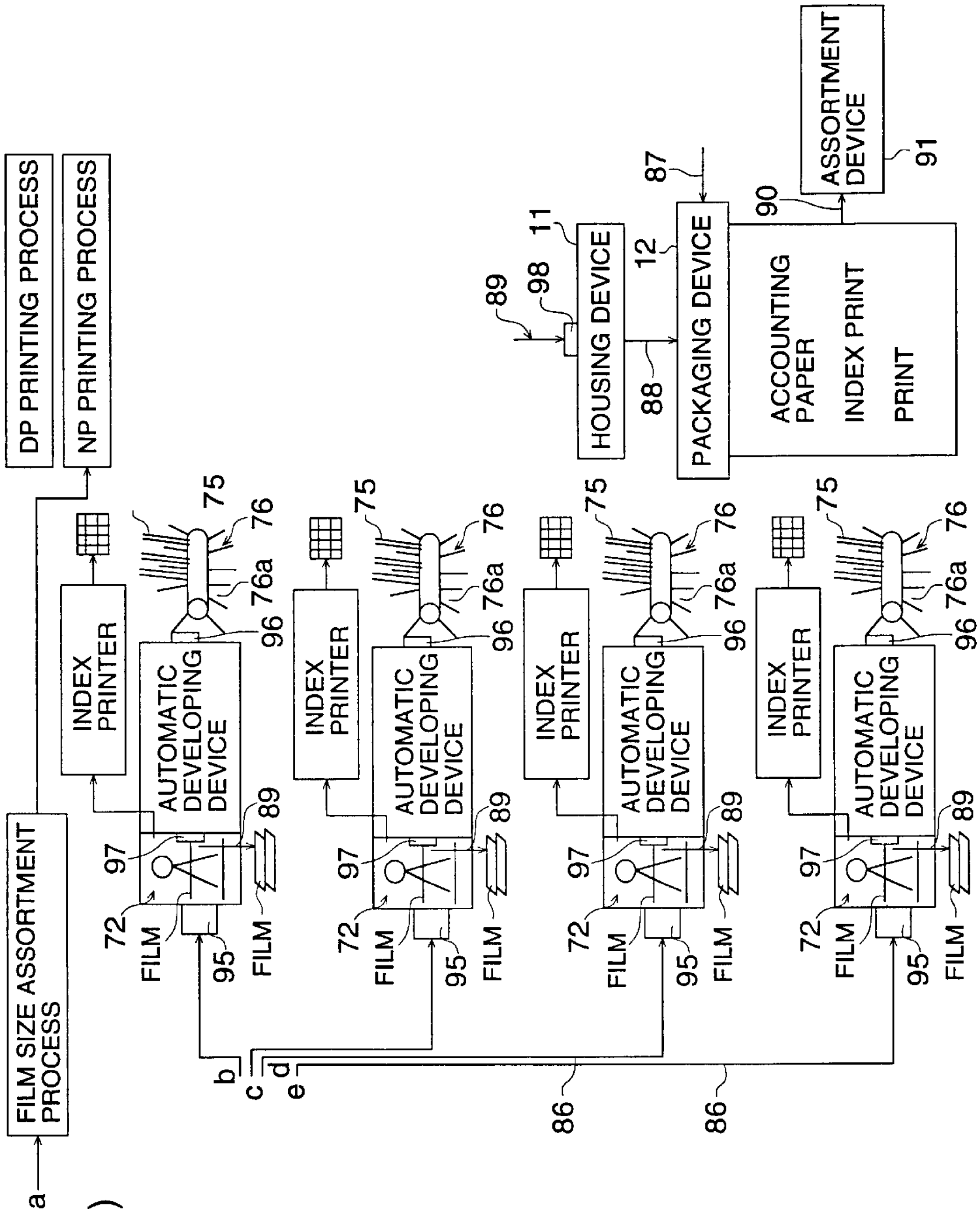

Hereinafter, operations conducted in the large scale photo-finishing laboratory after the photographed and undeveloped photographic film or a developed photographic film which a customer requested to process are handed over to a large scale photo-finishing laboratory. First, inputting and storage of information to control computer 51 as shown in FIG. 1, conducted after the photographed and undeveloped photographic film or a developed photographic film which a customer requested to process are handed over to a large scale photo-finishing laboratory, will be explained.

Inputting and storage of information to control computer 51, conducted after the photographed and undeveloped photographic film or a developed photographic film which a customer requested to process through a retail shop are handed over to a large scale photo-finishing laboratory, will be explained.

When the above-mentioned bar code slip 20*c* for data-input in a large scale photo-finishing laboratory and a housing container which houses a customer's photographed undeveloped photographic film and on which one of peelable seals on bar code slip 20*c* for data-input in a large scale photo-finishing laboratory are handed over to the large scale photo-finishing laboratory through a retail shop, information recorded on bar code slip 20*c* for data-input in a large scale photo-finishing laboratory, such as the retail shop identifying information, customer identifying information, reception number, information about whether it is a development and printing concurrent processing or only printing request, print specification information, reception date and time and finishing date and time are read by slip reader 50 in the large scale photo-finishing laboratory. Aforesaid information is inputted and stored in control computer 51. Control computer 51 stores the reception number and other information stored in a manner to have a corresponding there between. (In the embodiment of the present invention, as a reception number, a serial number which is accepted in plural retail shop having a business relationship with aforesaid large scale photo-finishing laboratory is used. If a serial number which is accepted by one retail shop is used, information combining aforesaid serial number and the retail shop identifying information is corresponded to a serial number which is accepted in the large scale photo-finishing laboratory to be stored. The serial number which is accepted by the large scale photo-finishing laboratory is corresponded with the above-mentioned other information to be stored. When a serial number which is not accepted by the large scale photo-finishing laboratory is used, information in which a serial number which is accepted only in the retail shop and the retail shop identifying information are combined is stored in such a manner that aforesaid information is corresponded with the above-mentioned other information. This mechanism is identical to a case in which the above-mentioned bar code slip 20*c* for data-input in a large scale photo-finishing laboratory and photographic film housing envelope packaging material 42 which packages photographic film housing envelope 44 which houses a developed and short-length photographic film are simultaneously handed over to the large scale photo-finishing laboratory. In addition, when a photographed and undeveloped photographic film or a developed photographic film which has been requested processing through a non-person photographic processing order reception device or a facility not through a retail shop is handed over to the large scale photo-finishing laboratory and when a serial number which is accepted only in each non-person photographic processing order reception device or a facility is used, information wherein the specific information on the above-mentioned non-person photographic processing order reception device or a facility and the above-mentioned serial number are combined are corresponded with a serial number which is accepted in the large scale photo-finishing laboratory and stored. The serial number which is accepted in the large scale photo-finishing laboratory and the above-mentioned information corresponding to other information are corresponded to be stored. In addition, when a serial number which is accepted in the large scale photo-finishing laboratory is not used, information wherein the serial number which is accepted in non-person photographic processing order reception device or a facility and specific information such as non-person photographic processing order reception device or a facility are combined is corresponded with information corresponding to other information to be stored.

When bar code slip 20*c* for data-input in a large scale photo-finishing laboratory and photographic film housing envelope packaging material 42 which packages photographic film housing envelope 44 which houses a developed and short-length photographic film are simultaneously handed over to the large scale photo-finishing laboratory (On photographic film housing envelope 44 or photographic film housing envelope packaging material 42, one of peelable seals provided on bar code slip 20*c* for data-input in a large scale photo-finishing laboratory is peeled) through a retail shop, information recorded on bar code slip 20*c* for data-input in a large scale photo-finishing laboratory, such as the retail shop identifying information, customer identifying information, reception number, information about whether it is a development and printing concurrent processing or only printing request, print specification information, reception date and time and finishing date and time are read by slip reader 50 in the large scale photo-finishing laboratory (when order frame identifying information and the order frame printing number information are recorded on bar code slip 20*c* for data-input in a large scale photo-finishing laboratory, the above-mentioned order frame identifying information and the order frame printing number information are also read). The above-mentioned information is stored in control computer 51, where the stored reception number and other information are corresponded to be temporarily stored. Namely, the reception number and the retail shop identifying information, customer identifying information, information about whether it is a development and printing concurrent processing or only printing request, print specification information, reception date and time and finishing date and time are corresponded to be stored. Concurrently with, or just before or just after order frame identifying information and the order frame printing number information being recorded on order slip 43 provided on photographic film housing envelope packaging material 42 are read through order reader 53, the reception number recorded on a peelable seal affixed on photographic film housing envelope packaging material 42 or photographic film housing envelope 44. Aforesaid information is stored in control computer 51, where the stored reception number and other information are corresponded to be temporarily stored. In control computer 51, two kinds of the above-mentioned information temporarily stored are compared. The reception number and other stored information are corresponded to be stored wherein information temporarily stored whose reception number is identical is regarded as one series of information. Namely, the reception number and the retail shop identifying information, customer identifying information, information about whether it is a development and printing concurrent processing or only printing request, print specification information, reception date.and time and finishing date and time are corresponded to be stored.

So far is an explanation about inputting and storage of information to control computer 51, conducted after the photographed and undeveloped photographic film or a developed photographic film which a customer requested to process through a retail shop are handed over to a large scale photo-finishing laboratory. Next, explanation about inputting and storage of information to control computer 51, conducted after the photographed and undeveloped photographic film or a developed photographic film which a customer requested to process not through a retail shop are handed over to a large scale photo-finishing laboratory will be made. In this case too, similar operation as when the photographed and undeveloped photographic film or a developed photographic film which a customer requested to process are handed over to a large scale photo-finishing laboratory will be made.

If bar code slip 20*c* for data-input in a large scale photo-finishing laboratory and a housing container which houses the customer's photographed and undeveloped photographic film on which one of seals peelable provided on bar code slip 20*c* for data-input in a large scale photo-finishing laboratory are simultaneously handed over to the large scale photo-finishing laboratory not through the retail shop, information is stored in control computer 51. However, since the retail shop is not intervened, the retail shop identifying information is not naturally recorded on control computer. Namely, in computer 51, the reception number and other information such as customer identifying information, information about whether it is a development and printing concurrent processing or only printing request, print specification information, reception date and time and finishing date and time are corresponded to be stored.

When bar code slip 20*c* for data-input in a large scale photo-finishing laboratory and photographic film housing envelope packaging material 42 which packages photographic film housing envelope 44 which houses a developed and short-length photographic film are simultaneously handed over to the large scale photo-finishing laboratory (on photographic film housing envelope 44 or photographic film housing envelope packaging material 42, one of peelable seals provided on bar code slip 20*c* for data-input in a large scale photo-finishing laboratory is peeled) not through the retail shop, storage of information onto control computer 51 is conducted. However since, in this case, the retail shop is not passed in the same manner as in the above, it is natural that retail shop identifying information is not recorded on control computer 51. Namely, in control computer 51, the reception number, customer identifying information, reception number, information about whether it is a development and printing concurrent processing or only printing request, print specification information, reception date and time and finishing date and time are corresponded to be stored.

Incidentally, when the above-mentioned peelable seal is not affixed on bar code slip 20*c* for data-input in a large scale photo-finishing laboratory, inputting and storage of information in control computer 51 is the same as above. In addition, when the retail shop read information recorded on bar code slip 20*c* for data-input in a large scale photo-finishing laboratory, store it in the electron recording medium, and send this recorded information to the large scale photo-finishing laboratory or hands over information to the large scale photo-finishing laboratory after storing information in a portable electronic recording medium, information is inputted and stored in control computer 51. In the former case, information sent by a receiving means provided in control computer 51 is received and stored. In the latter case, information recorded on a portable electronic recording medium is read by information reading means in a portable electronic recording medium provided in control computer 51 to be stored.

Incidentally, based on print use information and retail shop identifying information stored in control computer 51

(if there is no retail shop identifying information, identifying information about non-person photographic processing order reception device or a facility or customer identifying information) control computer 51 may prepare and store a film destination determination table showing to where photographed and undeveloped photographic film and a developed photographic film go as shown in FIG. 5. In the Table in FIG. 5, 80 and 91 described at the upper portion of the table represent the number of assortment device. Seven-digits numerals located left of the table represent a reception number. “2”, “4”, “3”, - - - “2” and “1” below “80” at the upper portion of the table shows to where each film goes after being assorted by an assorting device, namely they represent numbers identifying an exposure device. In addition, numerals “10”, “21”, “3”, - - - “45” and “38” below “91” at the upper portion of the table show to where the photographic film housing envelope packaging material assorted by the assortment device, namely it identifies where to be returned (the retail shop, person and non-person photographic processing order reception device or a facility). Information described in this Table will be utilized by assortment devices or sorting devices 80 and 91.

So far is an explanation about storage of information to control computer 51 as shown in FIG. 2, conducted after the photographed and undeveloped photographic film or a developed photographic film which a customer requested to process are handed over to a large scale photo-finishing laboratory.

From now on, two utilizing methods of information stored in control computer 51 in the large scale photo-finishing laboratory. One of these is to read information stored in control computer 51 which will be explained below, information read is recorded in the customer’s photographed and undeveloped photographic film or developed photographic film and photographic processing is conducted in the large scale photo-finishing laboratory based on aforesaid information. The other one of these is to read information stored in control computer 51 explained later, to supply information to the photographic processing steps which requires information and to conduct photographic processing in the large scale photo-finishing laboratory based on aforesaid information required in each step. First, the former utilizing method of information stored in control computer 51 will be explained.

First, reading of the information stored in control computer 51 and recording of the information to photographed and undeveloped photographic film or developed photographic film will be explained.

By means of reader as shown in FIG. 1, a reception number recorded on a peelable seal affixed on housing container 22 for photographed and undeveloped photographic film, photographic film housing envelope 44 or photographic film housing envelope packaging material 42. The read reception number is sent to control computer 51 storing the information. Control computer 51 to which the reception number was sent read all information stored in correspondence to the reception number which is identical to aforesaid reception number and all information necessary together with the reception number. The read information (the reception number and the information stored in correspondence with the reception number) is recorded in a non-imaging section on the front edge portion (a photographed undeveloped photographic film engaged in a spool shaft in housing container 2 is defined to be a retailer section) of the photographed and undeveloped photographic film housed in housing container 22 in which a peelable seal on which the reception number read for reading the read information is affixed and a non-imaging section of a developed photographic film (strictly speaking, in the case of photographic film housing envelope packaging material 42, a developed photographic film housed in photographic film housing envelope 44 packaged in photographic film housing envelope packaging material 42) housed in photographic film housing envelope 44 or photographic film housing envelope packaging material 42 on which a peelable film on which the read reception number is recorded for reading the information read is affixed. In addition, as described later, in order to use aforesaid recorded information as a partition for each order, it is preferable that the recording position of aforesaid information is a non-imaging section of the photographic film and, concurrently with this, a portion related to the front end portion or the retailer portion of the photographic film.

Figure 4:
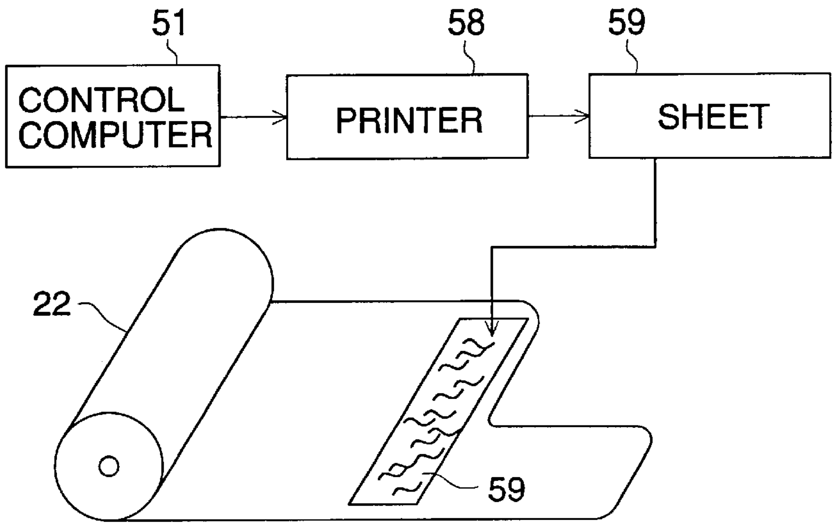
FIGS. 4(*a*), 4(*b*) and 4(*c*) are drawings showing a recording method of information read.
Figure 4:
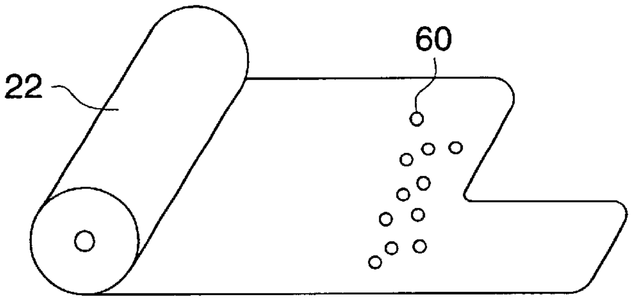
Figure 4:
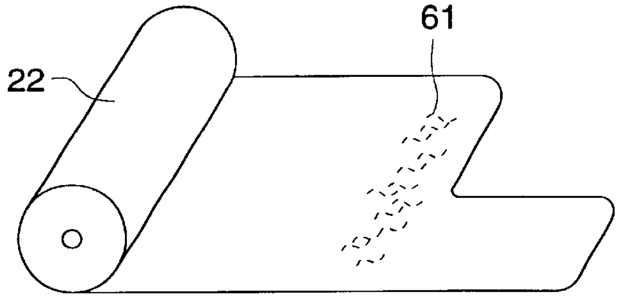

As a recording method of aforesaid information, there is a method in which the read information is recorded as a two-dimensional bar code on a sheet by a printer as shown in FIG. 4(*a*) and the sheet on which the bar code is recorded is affixed on the front edge non-imaging section of the above-mentioned photographed and undeveloped photographic film or on a non-imaging section of the above-mentioned developed photographic film. In addition, there is another method, as shown in FIG. 4(*b*), that the read information is converted to a two-dimensional point position information and this point is recorded on above-mentioned photographed and undeveloped photographic film or on a non-imaging section of the above-mentioned developed photographic film as hole 60. In addition, there is another method, as shown in FIG. 4(*c*), that the read information is converted to a two-dimensional information and latent image 61 is optically printed on above-mentioned photographed and undeveloped photographic film or on a non-imaging section of the above-mentioned developed photographic film.

The above-mentioned recorded information can be utilized as a partition for each of one order of the photographic film. Namely, when the above-mentioned information sensing means senses the above-mentioned information, the sensing results are utilized as information which indicates partition of one order of photographic film. Incidentally, information on a table as shown in FIG. 5 may be utilized in place of the print specification information and the retail shop identifying information (if there is no retail shop identifying information, identifying such as non-operator order receiving device or facility information or customer identifying information).

So far is an explanation about reading of the information stored in control computer 51 and recording of the information to photographed and undeveloped photographic film or developed photographic film in a large scale photo-finishing laboratory.

Among photographed and undeveloped photographic film or developed photographic film on which the above-mentioned read information has been recorded, the photographed and undeveloped photographic film is subjected to photographic processing by means of developing device 55. An image frame of the above-mentioned developed photographed photographic film is printed on a photographic paper by exposure device 72. The developed photographic film, on the other hand, is also printed on a photographic paper by exposure device 72. In the large scale photo-finishing laboratory of the embodiment of the present invention, as shown in FIG. 2, exposure device 72 is provided corresponding to plural printing specifications. Practically, it is provided with exposure device 72 which exposes onto EC printing specifications photographic paper (in FIG. 1, exposure device at the upper most step), exposure device 72 which exposes onto ESC printing specifications photographic paper (in FIG. 1, exposure device at the second upper most step), exposure device 72 which exposes onto LC printing specifications photographic paper (in FIG. 1, exposure device at the third upper most step) and exposure device 72 which exposes onto LSC printing specifications photographic paper (in FIG. 1, exposure device at the lower most step). Incidentally, there may be cases in which specific exposure device 72 may expose light on plural printing specifications photographic paper. With regard to photographed and undeveloped photographic film or developed photographic film on which the above-mentioned read information has been recorded, printing specification information recorded each of them is sensed, and the destination of each film is determined to exposure device 72 which exposes on a photographic paper having the same printing specifications. In aforesaid exposure device 72, the relevant image frame is exposed to light.

In order to expose an image frame by means of exposure device 72 which can expose on photographic paper having the same printing specifications as the printing specifications information sensed, the photographic film on which the above-mentioned read information is recorded must be partitioned for each of printing specifications. Therefore, in the large scale photo-finishing laboratory of the prevent invention, an assortment device is provided. The positioning of the assortment device in the photographic processing system has two types. One is in the front process of developing device 55, and the other is at the back of developing device 55. Hereinafter, a large scale photo-finishing laboratory in which the assortment device is located in front of developing device 55 will be explained.

In this occasion, photographed and undeveloped photographic film or developed photographic film on which the above-mentioned read information has been recorded are automatically conveyed to an assortment device by means of a conveyance device (not illustrated). In the assortment device, together with printing specification information, an identifying means which selectively identifies whether it requires a developing and printing simultaneous process, a negative film processing or only developing. In the embodiment of the present invention, the above-mentioned identifying means is provided in the assortment device. However, it is not necessarily provided in the assortment device. For example, it may be provided in the above-mentioned conveyance device. When information whether it requires a developing and printing simultaneous process, a negative film processing or only developing recorded in the photographic film conveyed is read, assortment device assorts said photographed and undeveloped photographic film or developed photographic film each having information read based of the above-mentioned information. As an assortment means, an appropriate conventional means such as a course switching gate are used. The course switching gate assorts the photographic films to EC course, ESC course, LC course, LSC course and only-developing course etc.

With regard to how to assort photographic films, those which require developing and printing simultaneous order, films are assorted to any of the EC course, the ESC course, the LC course and the LSC course for each of printing specifications sensed. With regard to negative print processing order too, films are assorted any of the EC course, the ESC course, the LC course and the LSC course for each of printing specifications sensed. With regard to only-developing order, films are assorted only to only-developing course.

Photographed and undeveloped photographic films which have been assorted to any of the EC course, the ESC course, the LC course and the LSC course and in which development and printing have been simultaneously ordered are automatically conveyed to developing device 55 by means of conveyance device 85 provided in each course. Developing device 55 is provided for each of conveyance device 85 (in FIG. 1, developing device is illustrated only one unit for convenience. However, originally, 5 units are provided. One of these is provided for developing an undeveloped photographic film assorted to the only-developing course.) so that photographed undeveloped photographic film conveyed by the conveyance device is automatically developed and ejected outside the device.

Developed photographic films which have been assorted to any of the EC course, the ESC course, the LC course and the LSC course and in which negative printing has been ordered are automatically conveyed to developing device 55 by means of the above-mentioned conveyance device provided. A developed photographic film conveyed to developing device 55 is caused to pass a conveyance path provided in developing device 55 which does not conduct developing (not illustrated) and caused to automatically eject outside developing device 55.

A photographic film which was developed by developing device and which was ejected outside developing device 55 and a photographic film which only passed developing device 55 are conveyed to exposure device 72 by means of conveyance means 86 which conveys aforesaid photographic film to exposure device 72 which is provided each of developing device and corresponding to aforesaid developing device. For example, an undeveloped photographic film assorted to the EC course is developed in developing device 55 and ejected. Following this, it is automatically conveyed to exposure device 72 which can expose onto a photographic paper with EC printing specifications. In addition, for example, a developed photographic film assorted to the LSC is ejected from developing device 55. Following this, aforesaid film is automatically conveyed to exposure device 72, by means of conveyance means 86, which can expose on photographic paper with the LSC printing specifications.

Incidentally, a developed photographic film in which negative film processing is requested and which has been assorted either of the EC course, the ESC course, the LC course and the LSC course may be conveyed to corresponding exposure device 72 without being automatically conveyed to developing device 55 by means of the above-mentioned conveyance device, by which constitution of developing device 55 become easier. An image frame of a photographic film conveyed to exposure device 72 is exposed on a photographic paper with a desired printing specifications by means of exposure device 72. At any place between inlet port of the photographic film in exposure device 72 and an exposure stage, reading means 95 which reads the above-mentioned information recorded on the photographic film is provided. Exposure device 72 utilizes information that reading means 95 read the above-mentioned information which is recorded on the photographic film as information which indicates partition of one order.

Here, how to take up the developed short-length film from photographic film housing envelope 44, whose explanation has been omitted so far, will now be explained.

In the embodiment of the present invention, plural developed short-length film housed in an arbitrary one photographic film housing enveloped 44 are taken up in all regardless whether there is an ordered frame which is used to printing or not, and all developed short-length film taken up is caused to pass the exposure section of either exposure device 72. Plural developed short-length film housed in an arbitrary one photographic film housing envelope are collected in a process post of the printing process. Due to aforesaid structure, a developed short-length film having an order frame used to printing and a developed short-length film having no order frame and thereby not used to printing are not separated in a printing process. Therefore, a conveyance path for conveying the above-mentioned films can be simplified and thereby the photographic processing system can be more compact. It is not necessary to check a developed short-length film having an order frame used to printing and a developed short-length film having no order frame and thereby not used to printing to be collected. Therefore, the photographic processing system can be more efficient.

A developed short-length film taking up device which takes up the developed short-length film housed in photographic film housing envelope 44 will be explained referring to FIGS. 7 and 8.

Figure 7:
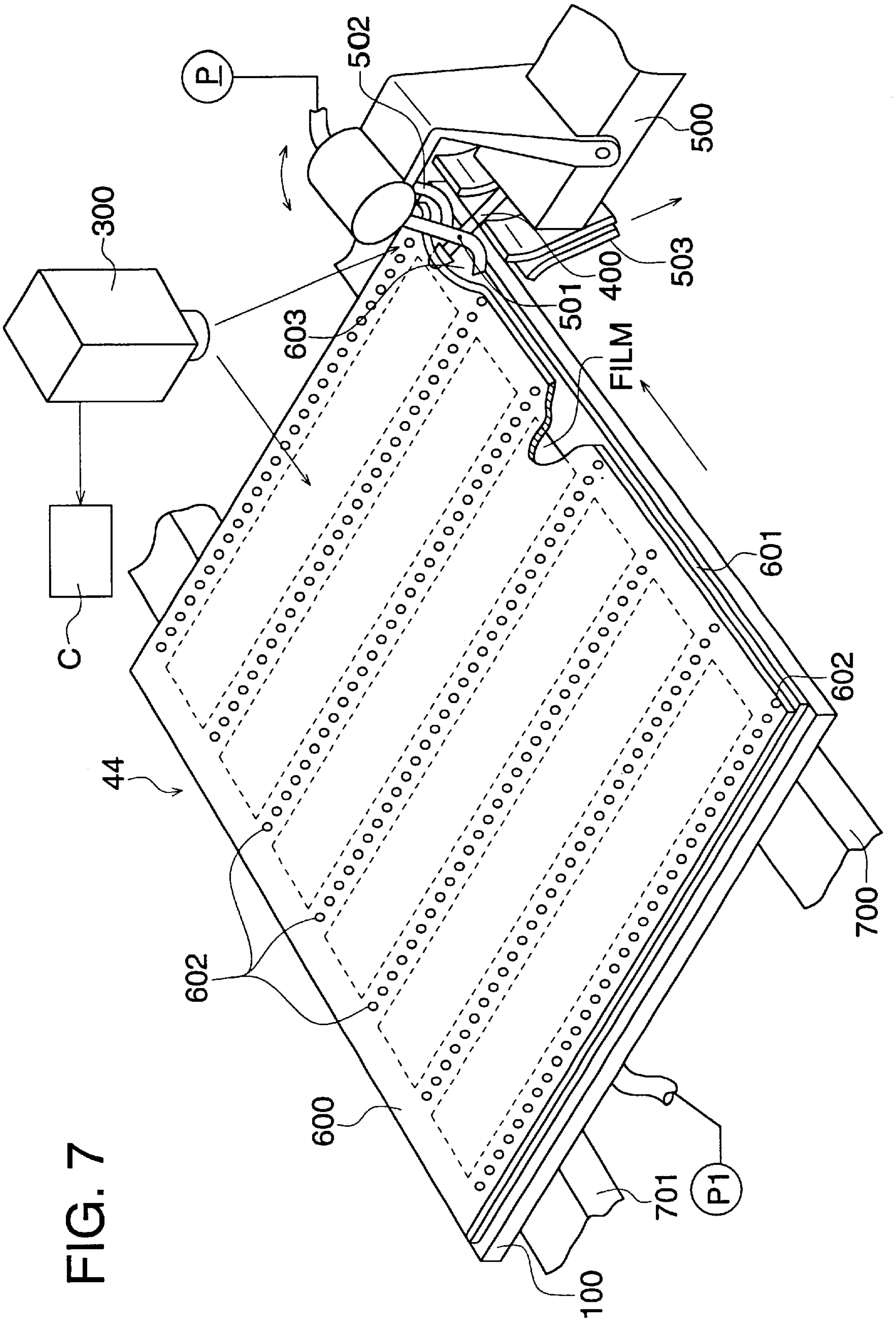
FIG. 7 shows a perspective view of a take-up device of a developed short-length film.

FIG. 7 is an overall schematic view of the above-mentioned developed short-length film taking up device.

In photographic film housing enveloped 44, plural envelope section 603 which sandwiches the developed short-length film using second sheet 600 and first sheet 601 and which has an aperture portion is formed due to jointing by means of jointing unit 602. In plural of the above-mentioned envelope 603, each of the above-mentioned developed short-length film is housed.

Photographic film housing envelope 44 is placed on photographic film housing envelope placement stand 100, and adsorbed by means of absorption pump P1 or maintained on the photographic film housing envelope placement stand 100 by means of a dixing member. Photographic film housing envelope placement stand 100 is provided on conveyance stands 700 and 701 in such a manner that it can move to the arrowed direction. Accordingly, taking up of the developed short-length film and movement of photographic film housing envelope 44 can be repeated successively.

Electronic camera 300 which photographs the developed short-length film on photographic film housing envelope 44 placed on photographic film housing envelope placement stand 100. By means of electronic camera 300, photographic film housing envelope 44 which houses the developed short-length film is photographed. From a photographed image, the form of the front edge and retailer edge of the developed short-length film is evaluated in control section C so that the developed short-length film housed in photographic film housing envelope 44 is respectively evaluated whether or not it can be taken up.

Numeral 400 is a taking up member of the developed short-length film. Taking up member 400 is provided on mechanism section 500 which takes up the developed short-length film from photographic film housing envelope 44. In addition, on mechanism section 500, air jetting members 501 and 502 for opening the mount of the aperture section of envelope section 603 formed in photographic film housing envelope 44 are provided. The above-mentioned electronic camera 300 checks that the developed short-length film inside photographic film housing envelope 44 can be taken up. When the film can be taken up by means of control section C, mechanism section 500 operates. By operating jetting pump P, envelope section 603 formed on photographic film housing envelope 44 is opened with air jetting members 501 and 502. Next, taking up member 400 is operated by means of mechanism section 500 so that the developed short-length film is taken up from photographic film housing envelope 44.

Plural developed short-length film housed in photographic film housing envelope 44 is monitored successively due to movement of photographic film housing envelope placement stand 100. When the form of the film is evaluated whether it is within the normal range or not by control section C, air jetting members 501 and 502 operates so that envelope section 603 is opened and thereby the developed short-length film is taken up by means of taking up member 400.

Figure 8:
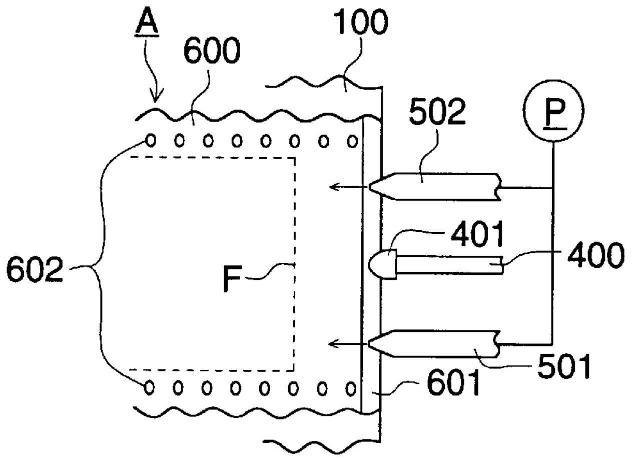
FIGS. 8(*a*), 8(*b*), 8(*c*) and 8(*d*) are explanation views showing operation order of a take-up device of a developed short-length film.
Figure 8:
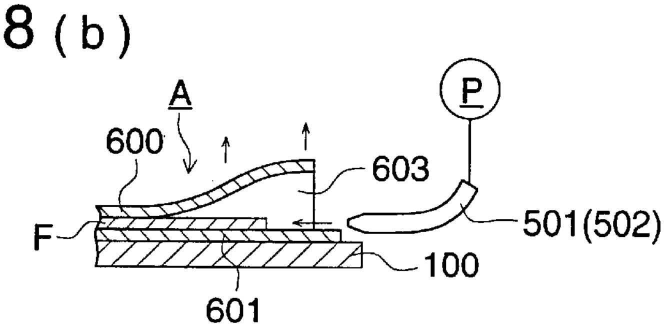
Figure 8:
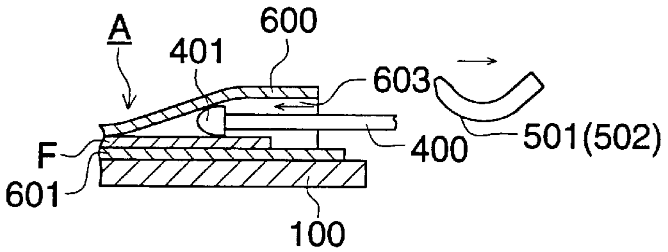
Figure 8:
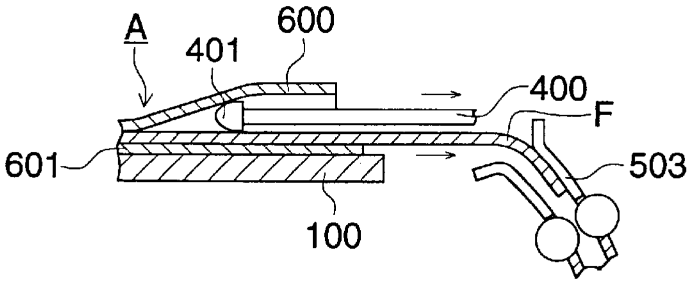

Referring to FIGS. 8(*a*), (*b*), (*c*) and (*d*), operation order for taking up the developed short-length film from the aperture section of envelope section 603 of photographic film housing envelope 44 using taking up member 400 will be explained.

First, as shown in FIG. 8(*a*), negative film placing stand 100 stops and air is jetted from air jetting means 501 and 502 by means of the above-mentioned jetting pump P toward the aperture portion of envelope section 603 wherein the developed short-length film is housed. As shown in FIG. 8(*b*), while second sheet 600 is taken up, the upper surface of the developed short-length film inside envelope section 603 is exposed.

Next, as shown in FIG. 8(*c*), taking up member 400 is inserted between the supper surface of the developed short-length film and second sheet 600 by means of mechanism section 500, while the upper surface of the developed short-length film is exposed. The end of taking up member 400 is formed with rubber having a high abrasion coefficient or high resistance member, and concurrently and taking up section 401 is provided inclined to the insertion direction for easy insertion. Taking up section 401 is inserted depending upon the position of the developed short-length film inside envelope 603, and thereby stops at a position where it surely contacts with the upper surface of the developed short-length film.

As shown in FIG. 8(*d*), while taking up section 401 contacts the upper surface of the developed short-length film, taking up member 400 moves toward taking up direction by means of mechanism section 500, and then, the developed short-length film is taken up from the aperture section of envelope 603. The developed short-length film moves outside by a distance which is a movement length of taking up member 400 for taking up, and introduced to film introduction member 503. In the above-mentioned manner, the developed short-length film is taken up from photographic film housing envelope 44.

When the printing specifications read by reading means 95 and the printing specifications set in exposure device 72 are different, exposure device 72 expresses "error occurrence" by means of an error occurrence expression means which informs the occurrence of error, causes ejection of the photographic film which is the case of the error so that printing of the above-mentioned photographic film is prevented.

Exposure device 72 exposes a required number of exposure on the ordered frame of a photographic film which was evaluated as a negative printing and processing order based on the order frame identifying information and order frame printing number information which has been-read by the above-mentioned reading means. After the printing of the photographic film is finished, conditions exposed by the exposure device 72 are recorded for each of one order by means of the exposure conditions recording means provided inside exposure device 72. However, it is not necessary that the above-mentioned exposure conditions recording means is provided inside exposure device 72. For example, it may be provided in a housing device or a packaging device described later. The above-mentioned recorded conditions are utilized when this photographic film is exposed in this large scale photo-finishing laboratory.

With regard to a photographic film first exposed in this photographic processing system in the embodiment of the present invention, when it is exposed in the photographic processing system later identical to this photographic processing system, this film will be exposed under the initial exposure conditions. Due to this, a printed image obtained through exposure based on this photographic film is almost the same as a printed image which will be exposed based on a photographic film next time. As an exposure conditions recording means, a means which affixes a sheet on which the exposure conditions are recorded onto the photographic film. However, when the exposure conditions recording means is provided in the housing device or a packaging device explained later, the sheet on which the exposure conditions are recorded by this means is affixed on a photographic film housing envelope.

In the embodiment of the present invention, a roll-type long photographic paper is loaded in exposure device 72. When exposing, the photographic paper is exposed as a long-roll form. The photographic paper is provided with partition information for one order The photographic paper is developed by automatic processing machine 73 to be ejected. The long-roll photographic paper ejected is cut by cutting device 96 for each frame which is provided close to the ejection section of the long-roll photographic paper. In cutting device 96, sensing means which senses the partition information for one order and a counter of frame number cut. Aforesaid sensed information from this sensing means and counting number from the counter are sent to sorter 76 having plural bins 76*a* provided for each automatic processing machine 73 adjacent to cutting device 96. Aforesaid sensed information and sorter 76 which received the counting number produces print 75 for one order by controlling the position of bins, which are housed in one bin 76*a*.

When recording of the exposure conditions is finished, a long-roll photographic film is cut by a cutting means (not illustrated) provided on exposure device 72 to be a short-length photographic film. On the cutting means, an identifying means which identifies whether this film is requested developing and processing simultaneously, negative film printing or only developing, by which the cutting means cuts the film to make a short length photographic film having printing and developing simultaneously number. Thus, all photographic film ejected from exposure device 72 is ejected as a short-length photographic film.

The short-length photographic film ejected from exposure device 72 is automatically conveyed to a housing device which houses a short-length photographic film into a photographic film housing envelope provided in each of aforesaid conveyance device 89 which houses the short-length photographic film by means of conveyance device 89 provide in ejection portion of exposure device 72. At the inlet of the photographic film at the housing device, a reading means which reads the above-mentioned information recorded on the photographic film is provided. The housing device utilizes the information that aforesaid reading means has already read the photographic film as information which represents partition of one order of the photographic film. The short-length photographic film conveyed to the housing device is housed in a photographic film housing envelope each of orders.

Print for one order housed in one bin 76*a* of the above-mentioned sorter 76 and a short-length photographic film for one order housed in the above-mentioned photographic film housing envelope are conveyed to packaging device 12 which packages said print for one order and short-length photographic film for one order in a photographic film housing envelope packaging material by means of conveying means 88 which is provided for each of housing device 11 and conveying means 87 provided for each of sorter 76. In the embodiment of the present invention, 5 units (in FIG. 1, only one unit is shown) of packaging device 12 for the EC, the ESC, the LC, the LSC and developing. The print for one order and the short-length photographic film for one order in a photographic film housing envelope are conveyed while an order of printing in exposure device 72 is kept. Therefore, the packaging device packages the print for one order and the short-length photographic film for one order in a photographic film housing envelope packaging material in an order conveyed under well-corresponding status.

An undeveloped photographic film assorted for "development only" course by means of the above-mentioned assortment device is automatically conveyed to developing device 55 intrinsically provided in conveyance device 85. The photographed undeveloped photographic film is automatically developed to be ejected to outside conveyed by the above-mentioned conveyance device 85. A long-roll photographic film ejected is cut to form a short-length photographic film having a prescribed frames by means of a cutting device (not illustrated) provided in conjunction with developing device 55. The short-length photographic film ejected from the cutting device is automatically conveyed to housing device 11 which houses the short-length photographic film in the photographic film housing envelope, by means of the conveyance device provided in the ejecting section of the short-length photographic film. At the inlet port for the photographic film in a housing device, a reading means which reads the above-mentioned information recorded in the photographic film is provided. The cutting device utilizes information that the above-mentioned information recorded on the photographic film is read as information showing partition of one order of the photographic film. The short-length photographic film conveyed to housing device 11 is housed in a photographic film housing envelope for each of one order.

The short-length photographic film for each of one order housed in a photographic film housing envelope is conveyed to a packaging device which packages the short-length photographic film for each of one order housed in the photographic film housing envelope in a photographic film housing envelope packaging material, by mean of a conveyance means provided in the housing device. The packaging device packages the short-length photographic film for each of one order housed in a photographic film housing envelope in the photographic film housing envelope packaging material, in a conveyed order. When the number of packaging device 12 (currently, 5 units for the EC, the ESC, the LC, the LSC and for developing) is attempted to be reduced from the viewpoint of space reduction or apparatus cost saving, the number the same as the reception number recorded on the photographic film which was the basis of the preparation of aforesaid print is recorded on either of print for one order, the reception number recorded on the short-length photographic film and the reception number recorded on the print are read by means of the reading means provided in packaging device 12 and thereby print for one order and the short-length photographic film for one order housed in the photographic film housing envelope are corresponded. Recording of the reception number to the print for one order transfers the reception number from reading means 95 in exposure device 72 to cutting device 96 provided in automatic processing machine 73, in the vicinity of the ejection section for a long-roll photographic paper, and recording may be conducted by a recording means provided in cutting device 96. Recording of the reception number onto a print for one order is not necessarily conducted directly on a print. Recording may be conducted onto a recording medium which is conveyed together with a print for one order.

Print for one order and a short-length photographic film housed in a photographic film housing envelope or all photographic film housing envelope packaging material which packages the short-length photographic film for one order housed in a photographic film housing envelope are conveyed to assortment device 91 which assorts aforesaid photographic film housing envelope packaging material for each of customer to which each film is returned by means of conveyance device 90 provided in conjunction with each packaging device 12. This assortment device 91 is provided with a reading means which selectively reads retail shop identifying information (when there is no retail shop identifying information, non-operator order receiving device or facility or customer identifying information. These information functions as information for identifying a customer to which the film is returned) recorded on a photographic film packaged in a photographic film housing envelope packaging material.

In the embodiment of the present invention, aforesaid identifying means is provided in the assortment device. However, this identifying means is not necessarily provided in the assortment device. For example, it may be provided during the above-mentioned conveyance device. Among information recorded on the photographic film, when the retail shop identifying information (when there is no retail shop identifying information, non-operator order receiving device or facility or customer identifying information.) is read by the reading means, based on this information, assortment device 91 assorts the photographic film housing envelope packaging material for each course. As an assortment means, in the embodiment of the present invention, a course switching gate (not illustrated) is used. However, any conventional means are available. Aforesaid course switching gate is arranged to switch to courses whose number is the number of the retail shop plus 2. One course is assigned to one retail shop. The above-mentioned two additional course is used for when the reading means did not read the retail shop identifying information. Namely, when a customer requested photographic processing to a large scale photo-finishing laboratory not through a retail shop, this course is used for returning the photographic film housing envelope packaging material not through the retail shop directry to the customer from large scale photo-finishing laboratory or through the non-operator order receiving device or facility to the customer from large scale photo-finishing laboratory. The photographic film housing envelope packaging material assorted to each course is conveyed by a conveyance means provided at the outlet of each switching portion of the course switching gate, and then housed in a housing box for returning provided at the downstream of the conveyance path from the conveyance means. Following this, they are returned to retail shops, etc. to which the films are to be returned.

Incidentally, if a photographic film is packed in the photographic film housing envelope packaging material in such a manner that information recorded on the photographic film is difficult to be read by the above-mentioned reading means, a reading means which reads information recorded on the photographic film in the above-mentioned housing device or packaging device may be provided. In addition, a recording means which records read information, specifically the reception number and the information identifying a customer to which the film is to be returned on the photographic film housing envelope or the photographic film housing envelope packaging material may be provided.

Next, a photographic processing system in which an assortment device is located at the back of developing device 55. In this occasion, a photographed and undeveloped photographic film or a developed photographic film is automatically conveyed to developing device 55 by means of conveyance device 81. In this occasion, an appropriate number of developing device are placed. In developing device 55, an identifying means (not illustrated) which selectively identifies whether this film is requested to be developing and printing simultaneously processed, to be printing from a negative film or only developing is provided. A photographed and undeveloped film which was judged to be requested developing and printing simultaneously or only developing is automatically developed by developing device 55 to be ejected. In addition, a developed photographic film which is identified to be requested negative film printing is caused to pass through a conveyance path (not illustrated) in which no photographic processing is conducted, by means of developing device 55, and then ejected outside developing device 55.

The developed by developing device 55 and ejected outside developing device 55 and the developed photographic film which was caused to pass through a conveyance path in which no photographic processing is conducted are automatically conveyed to assortment device 80 by means of a conveyance device provided in conjunction with photographic film ejection portion of developing device 55. In assortment device 80, an identifying means which selectively identifies print specifications information recorded on the photographic film and information whether this film is requested to be developing and printing simultaneously processed, to be printing from a negative film or only developing is provided.

In the embodiment of the present invention, aforesaid identifying means is provided in assortment device 80. However, it is not necessary to be provided in assortment device 80. For example, it may be provided in the above-mentioned conveyance device 81. In assortment device 80, as an assortment means, a course switching gate is used. Incidentally, as an assortment means, a conventional means are selectable. The course switching gate is so arranged that the course can be switched to the number of print specifications plus one. With regard to how to assort the photographic film, the photographic film which was identified as developing and printing simultaneously processed or to be printing from a negative film by the identifying device are assorted for each print specifications by means of the course switching gate. In the embodiment of the present invention, print specifications has 4 kinds, i.e., the EC, the ESC, the LC and the LSC. therefore, the photographic film is assorted to 4 courses depending upon its print specifications. The photographic film identified to be developing-only by an identifying means is assorted to a developing-only photographic film course. The photographic films assorted to each of the EC, the ESC, the LC and the LSC course are automatically conveyed to exposure devices 72 which correspond to each course by means of a conveyance means (not illustrated) provided close to the outlet of the course switching gate.

Processing after the photographic film is conveyed to exposure device 72 or the photographic film is assorted to developing-only course is omitted since it is identical to a case when the assortment device is located in front of developing device 55.

So far is a method in which information stored in control computer 51 is read, read information is recorded on a photographed and undeveloped film or a developed photographic film which the customer requested processing and photographic processing is conducted in a large scale photo-finishing laboratory based on the recorded information.

Next, a method in which information stored in control computer 51 is read, information is supplied to a photographic processing step which requires said information and photographic processing is conducted in a large scale photo-finishing laboratory based on information required in each step will be explained. Incidentally, a method in which information stored in control computer is read, read information is recorded on a photographed and undeveloped film or a developed photographic film which the customer requested to process and photographic processing is conducted in a large scale photo-finishing laboratory based on the recorded information will now be explained excluding the overlap.

In the conventional method, corresponding to the reception number recorded on a peelable seal attached to photographed and undeveloped photographic film housing container 22, photographic film housing packaging material 42 or a photographic film housing envelope 44, information stored in control computer 51 is read and recorded on an undeveloped photographic film or a developed photographic film. In this method, the reception number having the same reception number recorded on a peelable seal attached to photographed and undeveloped photographic film housing container 22, photographic film housing packaging material 42 or a photographic film housing envelope 44 is recorded on the undeveloped photographic film or a developed photographic film housed in photographed and undeveloped photographic film housing container 22, photographic film housing packaging material 42 or a photographic film housing envelope 44. In a step in a large scale photo-finishing laboratory which requires information stored in control computer 51, the reception number recorded on the undeveloped photographic film and a developed film is read, and sent to control computer 51. Information stored in control computer 51 corresponding to aforesaid reception number is read, and said read information is sent to steps in the large scale photo-finishing laboratory to be utilized there. Incidentally, it is preferable that only information required in each step in the large scale photo-finishing laboratory is sent from control computer 51 to each step in the large scale photo-finishing laboratory. As a step which requires information stored in the large scale photo-finishing laboratory, a step which identifies whether the photographic film is required developing and printing simultaneously , printing from a negative film or developing only, a step which identifies print specifications, a step which requires order frame identifying information in a negative film processing order and order frame printing number information and a step which identifies a customer to which a product in which ordered processing is finished is returned are cited.

So far is an explanation as to a method in which information stored in control computer 51 is read, read information is supplied to photographic processing processes which need said information and photographic processing is conducted in a large scale photo-finishing laboratory based on the recorded information.

In an explanation so far, as a recording medium in which an image is recorded, a photographic film was used. However, a recording medium in which an image is electronically recorded may be used. For example, an electronic recording medium in which an electronic image taken by means of an electronic photo-taking camera is treated in the same manner as a developed photographic film in a printing from a negative film order. An image recorded on a developed photographic film in which developing and printing are requested simultaneously or a photographic film in which developing only is requested is taken electronically and then recorded on an electronic recording medium. This electronic recording medium is treated in the same manner as a photographic film in which developing and printing simultaneously requested or a developed photographic film in which printing from a negative film. In the above-mentioned occasion, as an exposure device, those which can be printed with an electronic recording medium as a basis.

Figure 6:
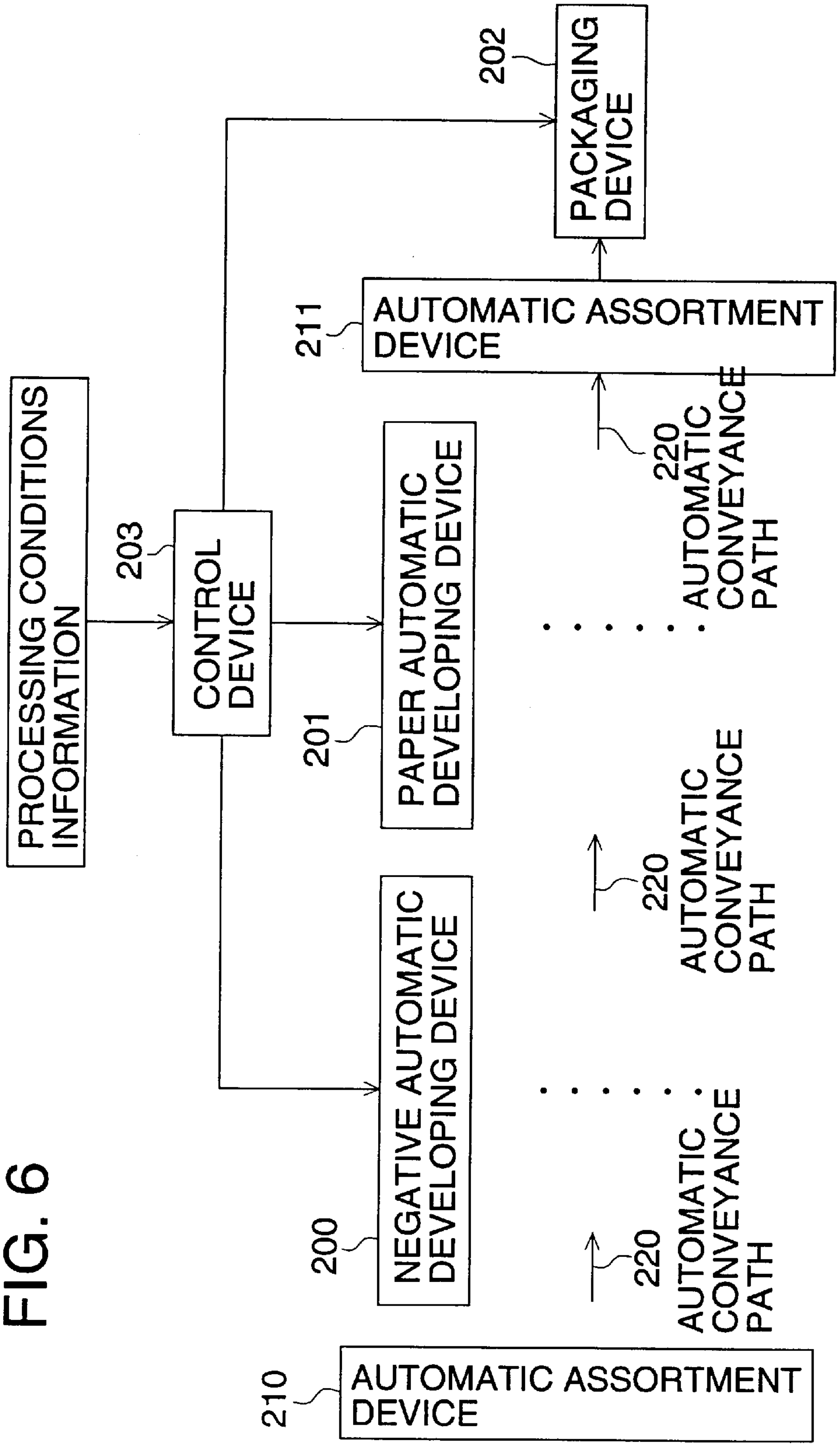
FIG. 6 shows a schematic block diagram of another example of the photographic processing system.

As shown in FIG. 6, this photographic processing system is composed of plural negative film automatic developing devices 200 which conduct negative film developing, plural paper automatic developing device 201 which conduct paper developing and one or more packaging device 202. Control device 203 determines, based on processing conditions information carried by a negative film processed or a negative film cartridge, whether or not a negative developing step is conducted, (if conducted) which negative film automatic developing device 200 is used, whether or not a paper developing step is used and (if conducted) which paper automatic developing device 200 is used, and controls. In addition, based on the processing conditions information stored corresponding to the film identifying information carried by a negative film processed or a negative film cartridge, control device 203 may determine to control.

According to this photographic processing system, when arbitrary number of negative film automatic developing device 200, paper automatic developing device 201 and packaging device 202 without the combination of each one of all devices are combined respectively for photographic processing, using information such as a simultaneous printing, re-printing and print size, with a negative film, or a negative film cartridge a processing device and a processing step are selected while human being does not intervene so that automatization of processing in a lab is contrived.

While providing with automatic assortment devices 210 and 211, automatic conveyance path 220 is respectively provided between automatic assortment device 210 and negative film automatic developing device 200, between negative film automatic developing device 200 and paper automatic developing device 201, and between paper automatic developing device 201 and automatic assortment devices 211. Each of automatic conveyance path 220 conveys the photographic film to the following step based on information about destination determination of a film processed. In a photographic processing system composed of automatic assortment devices 210 and 211, plural negative film automatic developing devices 200, plural paper automatic developing devices 201 and packaging device 202, photographic film is conveyed to the following step based on information about destination determination of a film processed by the automatic conveyance path 220. Thus, automatization of processing can be attempted.

As discussed above, according to the photographic processing system of Items 1 to 52, in a photographic processing system for processing a photographic film for each order without splicing it to other photographic film, since a destination of each of plural photographic films having a different destination from each other is determined based on photographic film destination determining information recorded on a photographic film to be processed, an event in which the destination of the photographic film can not be determined due to the separation of the photographic film destination determining information from the photographic film can be avoided, and an automation of the photographic processing system can be enhanced.

According to the photographic processing system of Items 53 and 54, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

According to the photographic processing system of Item 55, in the photographic processing system provided with an automatic sorting apparatus, one or more of automatic negative film developing apparatus for conducting negative film development, one or more of automatic photographic paper developing apparatus for conducting photographic paper development, and one or more of packaging apparatus, the photographic film can be automatically conveyed to the next process based on the destination determining information of the film to be processed, thereby attaining automation of photographic processing in a laboratory.

According to the photographic film destination determining method of Items 56 to 107, in a photographic processing system for processing a photographic film for each order without splicing it to other photographic film, since a destination of each of plural photographic films having a different destination from each other is determined based on photographic film destination determining information recorded on a photographic film to be processed, an event in which the destination of the photographic film can not be determined due to the separation of the photographic film destination determining information from the photographic film can be avoided, and an automation of the photographic processing system can be enhanced.

According to the photographic film destination determining method of Items 108 and 109, in the case that the photographic processing apparatus is conducted by combining the automatic negative film developing apparatus, the automatic photographic paper developing apparatus and the packaging apparatus by different sets of each of them without combining them by a single set of each of them, processing apparatus and processing processes are selected by the information as to a simultaneous print, reprint, print size and so on provided on a negative film or a negative film cartridge without involving a person, thereby attaining automation of photographic processing in a laboratory.

According to the photographic film destination determining method of Item 110, in the photographic processing system provided with an automatic sorting apparatus, one or more of automatic negative film developing apparatus for conducting negative film development, one or more of automatic photographic paper developing apparatus for conducting photographic paper development, and one or more of packaging apparatus, the photographic film can be automatically conveyed to the next process based on the destination determining information of the film to be processed, thereby attaining automation of processing.

According to the photographic processing system of Items 111 to 120, in a photographic processing system for processing a photographic film for each order without splicing it to other photographic film, since a destination of each of plural photographic films having a different destination from each other is determined based on photographic film destination determining information corresponding to a photographic film to be processed, the destination of the photographic film is determined surely and rapidly, and an automation of the photographic processing system can be enhanced.

According to the photographic processing system of Items 121 to 131, an event in which the destination of the photographic film at which the photographic film is printed to a photographic paper under the requested print-specification in the photographic processing system can not be determined can be avoided, and an automation of the photographic processing system can be enhanced.

According to the photographic processing system of Items 132 to 134, a destination of each of plural photographic paper having a different destination from each other is surely determined based on photographic paper destination determining information recorded on a photographic paper, and an automation of the photographic processing system can be enhanced.

According to the photographic film destination determining method of Items 135 to 144, in a photographic processing system for processing a photographic film for each order without splicing it to other photographic film, since a destination of each of plural photographic films having a different destination from each other is determined based on photographic film destination determining information corresponding to a photographic film to be processed, the destination of the photographic film is determined surely and rapidly, and an automation of the photographic processing system can be enhanced.

According to the photographic film destination determining method of Items 145 to 155, an event in which the destination of the photographic film at which the photographic film is printed to a photographic paper under the requested print-specification in the photographic processing system can not be determined can be avoided, and an automation of the photographic processing system can be enhanced.

According to the photographic film destination determining method of Items 156 to 158, a destination of each of plural photographic paper having a different destination from each other is surely determined based on photographic paper destination determining information recorded on a photographic paper, and an automation of the photographic processing system can be enhanced.

What is claimed is:

1. A photographic processing system comprising:

an inputting means for inputting photographic film identification information and print specification information of a photographic film into a memory;

the memory capable of memorizing the photographic film identification information and the print specification information in a correlated manner;

a first reading means for reading photographic film identification information provided on the photographic film;

a sending means for sending the photographic film identification information provided on the photographic film read by the first reading means to the memory;

a verifying means for verifying the photographic film identification information sent by sending means with the photographic film identification information memorized by the memory;

a second reading means for reading the print specification information corresponding to the verified photographic film identification information from the memory;

a transmitting means for transmitting the print specification information read by the second reading means; and an exposing apparatus for exposing an image from the photographic film onto photographic paper;

wherein the exposing apparatus exposes the image in accordance with the print specification information from the print specification information transmitted by transmitting means.

2. The photographic processing system of claim 1 wherein the print specification information comprises a print size and a surface type for the photographic paper.

3. The photographic processing system of claim 1 wherein the photographic film identification information is provided on the photographic film by pasting a sheet on which the photographic film identification information is written onto the photographic film.

4. An image forming system in which a printed image is formed from a photographic film comprising:

an inputting means for inputting photographic film identification information and at least one of a print specification information for each of a plurality of photographic films into a memory;

the memory capable of memorizing the photographic film identification information and the print specification information in a correlated manner;

a first reading means for reading photographic film identification information provided on a photographic film or a container of the photographic film;

a sending means for sending the photographic film identification information read by the first reading means to the memory;

a verifying means for verifying the photographic film identification information sent by sending means with the photographic film identification information memorized in the memory;

an exposing apparatus for exposing an image from the photographic film onto photographic paper; and a transmitting means for transmitting the print specification information read by a second means to the exposing apparatus;

wherein the exposing apparatus exposes the image to make the printed image in accordance with the information transmitted by transmitting means.

5. The image forming system of claim 4 wherein the print specification information comprises a print size and a surface type for the photographic paper.

6. The image forming system of claim 4 wherein the photographic film identification information is provided on the photographic film by pasting a sheet on which the photographic film identification information is written onto the photographic film.

7. An image forming system in which a printed image is formed from a photographic film comprising:

an inputting means for inputting photographic film identification information, at least one of a print specification information, ordered frame specifying information and print number information for the ordered frame for each of a plurality of photographic films;

a memory for storing the photographic film identification information, at least one of the print specification information, the ordered frame specifying information and the print number information for the ordered frame for each of the plurality of photographic films in a correlated manner;

a first reading means for reading photographic film identification information provided on a photographic film or a container of the photographic film;

a printer for forming an image on a printing medium;

wherein photographic film identification information read by the first reading means is transmitted to the memory so that the at least one of the print specification information, the ordered frame specifying information and the print number information for the ordered frame corresponding to the film identification information is specified and is transmitted to the printer in order for the printer to form the image in accordance with the at least one of the print specification information, the ordered frame specifying information and the print number information for the ordered frame.

8. The image forming system of claim 7 wherein the printer comprises an exposing device which exposes the image on the photographic film to make the printed image on the printing medium in accordance with the at least one of the print specification information, the ordered frame specifying information and the print number information for the ordered frame.

9. The image forming system of claim 8 wherein the printing medium comprises a photographic paper.

10. The image forming system of claim 7 wherein the photographic film identification information read by the first reading means is transmitted to the memory so that the print specification information corresponding to the film identification information is specified and is transmitted to the printer in order for the printer to form the image in accordance with the print specification information.

* * * * *